United States Patent
Saito et al.

(10) Patent No.: US 9,292,211 B2
(45) Date of Patent: Mar. 22, 2016

(54) COMPUTER SYSTEM AND DATA MIGRATION METHOD

(75) Inventors: Hideo Saito, Kawasaki (JP); Yoshiaki Eguchi, Yokohama (JP); Masayuki Yamamoto, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 13/063,433

(22) PCT Filed: Mar. 2, 2011

(86) PCT No.: PCT/JP2011/001217
§ 371 (c)(1),
(2), (4) Date: Mar. 10, 2011

(87) PCT Pub. No.: WO2012/117447
PCT Pub. Date: Sep. 7, 2012

(65) Prior Publication Data
US 2012/0226860 A1    Sep. 6, 2012

(51) Int. Cl.
*G06F 12/02* (2006.01)
*G06F 3/06* (2006.01)
*G06F 12/08* (2006.01)

(52) U.S. Cl.
CPC .............. *G06F 3/0617* (2013.01); *G06F 3/067* (2013.01); *G06F 3/0635* (2013.01); *G06F 3/0647* (2013.01); *G06F 3/0665* (2013.01); *G06F 12/02* (2013.01)

(58) Field of Classification Search
USPC ........................................................ 711/118
See application file for complete search history.

(56) References Cited

U.S. PATENT DOCUMENTS 7,054,893 B2 *   5/2006   Mogi et al.
7,461,196 B2 *  12/2008   Kawamura et al. ............... 711/2

(Continued)

FOREIGN PATENT DOCUMENTS

EP    1 857 918 A2    11/2007
JP    11-085576       3/1999

(Continued)

OTHER PUBLICATIONS

PCT International Search Report and Written Opinion on application No. PCT/JP2011/001217 mailed Oct. 10, 2011; 13 pages.

*Primary Examiner* — Tuan Thai
*Assistant Examiner* — Gautam Sain
(74) *Attorney, Agent, or Firm* — Foley & Lardner LLP

(57) ABSTRACT

A path is formed between a host computer and storage apparatuses without depending on the configuration of the host computer and a network and a plurality of volumes having a copy function are migrated between storage apparatuses while keeping the latest data.

A computer system includes a host computer and first and second storage apparatuses, wherein the second storage apparatus virtualizes a plurality of migration source volumes as a plurality of migration destination volumes and provides them to the host computer; and if the second storage apparatus receives an input/output request for each migration destination volume, it reflects data in each migration source volume via each migration destination volume and the host computer cancels a path to each migration source volume and registers a path to each migration destination volume; and if the second storage apparatus receives a write request, it writes write data to each migration destination volume and each migration source volume and migrates copy processing control information and data until the termination of migration processing.

14 Claims, 28 Drawing Sheets

(56) References Cited

U.S. PATENT DOCUMENTS

| | | |
|---|---|---|
| 2002/0016889 A1 | 2/2002 | Cawley |
| 2004/0049553 A1 | 3/2004 | Iwamura et al. |
| 2005/0120172 A1* | 6/2005 | Ozaki et al. ................ 711/114 |
| 2005/0138308 A1* | 6/2005 | Morishita et al. ........... 711/162 |
| 2005/0188166 A1 | 8/2005 | Fujibayashi et al. |
| 2005/0278492 A1* | 12/2005 | Stakutis et al. ............. 711/161 |
| 2006/0005074 A1* | 1/2006 | Yanai et al. ..................... 714/5 |
| 2006/0085607 A1* | 4/2006 | Haruma ....................... 711/161 |
| 2006/0248302 A1 | 11/2006 | Yamamoto et al. |
| 2007/0055840 A1 | 3/2007 | Yamamoto et al. |
| 2007/0101097 A1 | 5/2007 | Serizawa et al. |
| 2007/0113037 A1 | 5/2007 | Eguchi et al. |
| 2007/0198604 A1* | 8/2007 | Okada et al. ................. 707/202 |
| 2007/0266216 A1 | 11/2007 | Arakawa et al. |
| 2007/0283366 A1 | 12/2007 | Iwamura et al. |
| 2008/0177947 A1 | 7/2008 | Eguchi et al. |
| 2009/0055586 A1* | 2/2009 | Kawamura et al. ........... 711/114 |
| 2009/0307391 A1 | 12/2009 | Yamamoto et al. |
| 2010/0169569 A1 | 7/2010 | Yamamoto et al. |
| 2010/0180077 A1 | 7/2010 | Satoyama et al. |

FOREIGN PATENT DOCUMENTS

| | | |
|---|---|---|
| JP | 2002-82775 | 3/2002 |
| JP | 2002-149349 A | 5/2002 |
| JP | 2003-85018 | 3/2003 |
| JP | 2003-330781 A | 11/2003 |
| JP | 2003-345522 | 12/2003 |
| JP | 2004-13215 | 1/2004 |
| JP | 2004-102374 | 4/2004 |
| JP | 2004-220450 | 8/2004 |
| JP | 2005-11277 | 1/2005 |
| JP | 2005-182222 | 7/2005 |
| JP | 2005-182708 | 7/2005 |
| JP | 2005-209055 A | 8/2005 |
| JP | 2006-113895 A | 4/2006 |
| JP | 2006-155640 | 6/2006 |
| JP | 2007-072538 A | 3/2007 |
| JP | 2007-115221 | 5/2007 |
| JP | 2007-122432 | 5/2007 |
| JP | 2007-310495 | 11/2007 |
| JP | 2008-47142 | 2/2008 |
| JP | 2008-152807 | 7/2008 |
| JP | 2008-176627 | 7/2008 |

* cited by examiner

COMPUTER SYSTEM AND DATA MIGRATION METHOD

TECHNICAL FIELD

The present invention relates to a computer system and a data migration method. Particularly, this invention relates to a computer system and data migration method suited for use in data migration between storage apparatuses.

BACKGROUND ART

A possible configuration of a computer system for dealing with large-scale data would be a configuration that gathers a plurality of storage apparatuses to be considered as one system. From among possible examples of such a system configuration, there is a possible example in which along with an increase in the number of storage apparatuses, volumes in a certain storage apparatus may be migrated to another storage apparatus for the purpose of load equalization between the storage apparatuses.

Regarding such a computer system, it is desirable that volumes can be migrated without stopping transmission and reception of data between the host computer and the storage apparatuses. If a copy function is applied to migration source volumes at a migration source storage apparatus, it is desirable that the copy function processing should be continued also at a migration destination storage apparatus.

Patent Literature 1 discloses a method for migrating volumes between storage apparatuses without stopping transmission and reception of data between a host computer and storage apparatuses so that the copy function processing executed at a migration source storage apparatus is continued at a migration destination storage apparatus.

CITATION LIST

Patent Literature

PTL 1: Japanese Patent Application Laid-Open (Kokai) Publication No. 2007-115221

SUMMARY OF INVENTION

Technical Problem

Regarding the method of Patent Literature 1, an alternate path program in the host computer or in a network device migrates a receiver of an input/output request receiver from the host computer from the migration source storage apparatus to the migration destination storage apparatus. When such migration is performed, the alternate path program performs special control to migrate the input/output request receiver without going through a state of issuing the input/output request simultaneously to the migration source storage apparatus and the migration destination storage apparatus in order to maintain data integrity.

However, if the above-described special control cannot be performed because the alternate path program which is originally used is of a standard type, it is necessary to replace the alternate path program. When doing so, data transmission and reception between the host computer and the storage apparatuses need to be stopped.

Also, the method of Patent Literature 1 cannot keep data of migration source volumes up-to-date after the host computer migrates the input/output request receiver to the migration destination storage apparatus. Therefore, if a failure occurs in the migration destination storage apparatus during the migration, the data of the migration source storage apparatus cannot be used for restoration from the failure.

The present invention was devised in light of the above-described problems and it is an object of this invention to provide a computer system and data migration method capable of: forming a path to migrate volumes between a host computer and storage apparatuses without depending on the configuration of the host computer and a network device; and migrating a plurality of volumes, which are targets of local copying, from a migration source storage apparatus to a migration destination storage apparatus, while keeping data of the volumes up-to-date.

Solution to Problem

In order to solve the above-described problems, the present invention is characterized in that it includes a host computer, and a first storage apparatus and a second storage apparatus that are connected via a network with the host computer; wherein the first storage apparatus controls copy processing between a plurality of migration source volumes, which constitute copy processing targets, and stores control information for the copy processing; wherein the second control unit virtualizes the plurality of migration source volumes as a plurality of migration destination volumes belonging to the second storage apparatus and provides them to the host computer; and if the second storage apparatus receives an input/output request for the plurality of migration destination volumes from the host computer, it controls data input to, and output from, the plurality of virtualized migration source volumes via the plurality of migration destination volumes; on the other hand, if the second storage apparatus provides the plurality of the virtualized migration destination volumes to the host computer, the host computer registers a path to the plurality of migration destination volumes as an alternate path to the plurality of migration source volumes, cancels registration of a path to the plurality of migration source volumes, and changes a receiver of the input/output request from the first storage apparatus to the second storage apparatus based on the registered path; and wherein if the second storage apparatus receives the write request as the input/output request to the plurality of migration destination volumes via the registered path, on condition that it executes processing for writing write data to the plurality of migration destination volumes and the plurality of migration source volumes until termination of migration processing for migrating the migration target volumes, it executes, as the migration processing for migrating the migration target volumes, control information migration processing for migrating the control information for the copy processing, which is stored by the first storage apparatus, to the second storage apparatus and data migration processing for migrating data stored in each of the migration source volumes to each of the migration destination volumes.

Advantageous Effects of Invention

According to the present invention, a path for migrating volumes between a host computer and storage apparatuses can be formed without depending on the configuration of the host computer and a network device and a plurality of volumes, which are targets of local copying, can be migrated from a migration source storage apparatus to a migration destination storage apparatus, while keeping data of the volumes up-to-date.

DESCRIPTION OF EMBODIMENTS

First Embodiment (1-1) Configuration of this Computer System

Figure 1:
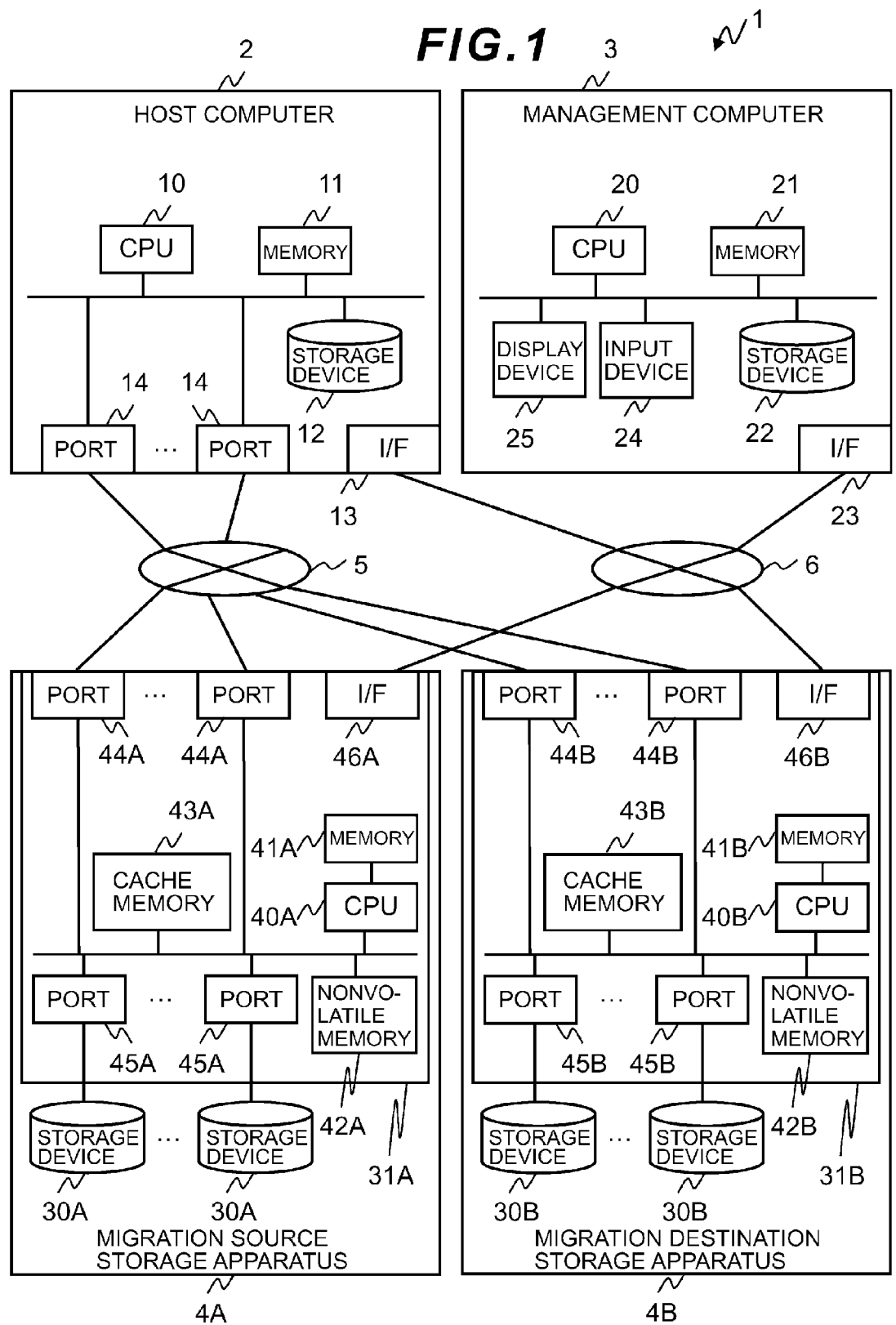
FIG. 1 is a block diagram showing the overall configuration of a computer system according to a first embodiment and a second embodiment.

FIG. 1 is a block diagram showing the overall configuration of a computer system according to this embodiment. Referring to FIG. 1, a computer system 1 includes a host computer 2, a management computer 3, two storage apparatuses 4A, 4B, and networks such as a SAN (Storage Area Network) 5, and a LAN (Local Area Network) 6. The host computer 2 is connected via the SAN 5 to each storage apparatus 4A, 4B and the management computer 3 is connected via the LAN 6 to the host computer 2 and each storage apparatus 4A, 4B.

The host computer 2 includes a CPU 10, a memory 11, a storage device 12, an interface control unit 13, and a plurality of ports 14. The CPU 10 is a processor for controlling the operation of the entire host computer 2, reads various programs stored in the storage device 12 to the memory 11 and executes them, and issues input/output requests (access requests) including read requests or write requests. The memory 11 is used to store the various programs read by the CPU 10 from the storage device 12 and is also used as a working memory for the CPU 10.

The storage device 12 is composed of, for example, an HDD (hard disk drive) or an SSD (Solid State Drive) and is used to store and retain various programs and control data. The interface control unit 13 is an adapter for connecting the host computer 2 to the LAN 6 and each port 14 is an adapter for connecting the host computer 2 to the SAN 5.

The management computer 3 is a computer device for managing the host computer 2 and each storage apparatus 4A, 4B and includes a CPU 20, a memory 21, a storage device 22, an input device 24, and a display device 25.

The CPU 20 is a processor for controlling the operation of the entire management computer 3, and reads various programs stored in the storage device 22 to the memory 21 and executes them.

The memory 21 is used to store the various programs read by the CPU 20 from the storage device 22 when activating the management computer 3 and is also used as a working memory for the CPU 20.

The storage device 22 is composed of, for example, an HDD or an SSD and is used to store and retain various programs and control data. The interface control unit 23 is an adapter for connecting the management computer 3 to the LAN 6. The input device 24 is composed of, for example, a keyboard and a mouse; and the display device 25 is composed of, for example, a liquid crystal display.

The storage apparatus 4A serving as a first storage apparatus includes a plurality of storage devices 30A and a control unit 31A for controlling data input to, and output from, the storage devices 30A. The storage apparatus 4B serving as a second storage apparatus includes a plurality of storage devices 30B and a control unit 31B for controlling data input to, and output from, the storage devices 30B.

Each storage device 30A, 30B is composed of, for example, an HDD or an SSD. A plurality of storage devices 30A, 30B constitute one RAID (Redundant Array of In-expensive Disks) group and one or more logical units are set in storage areas provided by one or more RAID groups. Data from the host computer 2 are stored in units of blocks, each of which is of a specified size.

The control unit 31A serving as a first control unit includes a CPU 40A, a memory 41A, a nonvolatile memory 42A, a cache memory 43A, a plurality of host-side ports 44A, a plurality of storage-device-side ports 45A, and an interface control unit 46A. The control unit 31B serving as a second control unit includes a CPU 40B, a memory 41B, a nonvolatile memory 42B, a cache memory 43B, a plurality of host-side ports 44B, a plurality of storage-device-side ports 45B, and an interface control unit 46B.

The CPU 40A, 40B is a processor for controlling the operation of the entire storage apparatus 4A, 4B and reads various programs stored in the nonvolatile memory 42A, 42B to the memory 41A, 41B and executes them.

The memory 41A, 41B is used to store the various programs read by the CPU 40A, 40B from the nonvolatile memory 42A, 42B when activating the storage apparatus 4A, 4B and is also used as a working memory for the CPU 40A, 40B.

The nonvolatile memory 42A, 42B is used to store and retain various programs and control data. The cache memory 43A, 43B is used mainly to temporarily store data sent and received between the host computer 2 and the storage devices 30A, 30B.

The host-side ports 44A, 44B are adapters for connecting the storage apparatus 4A, 4B to the SAN 5 and the storage-device-side ports 45A, 45B are adapters for connecting the control unit 31A, 31B to the storage devices 30A, 30B. The interface control unit 46A, 46B is an adapter for connecting the storage apparatus 4A, 4B to the LAN 6.

Incidentally, in this embodiment, the storage apparatus 4A is a migration source of the migration target volumes and the storage apparatus 4B is a migration destination of the migration target volumes. They will be hereinafter referred to as the migration source storage apparatus 4A and the migration destination storage apparatus 4B.

Figure 2:
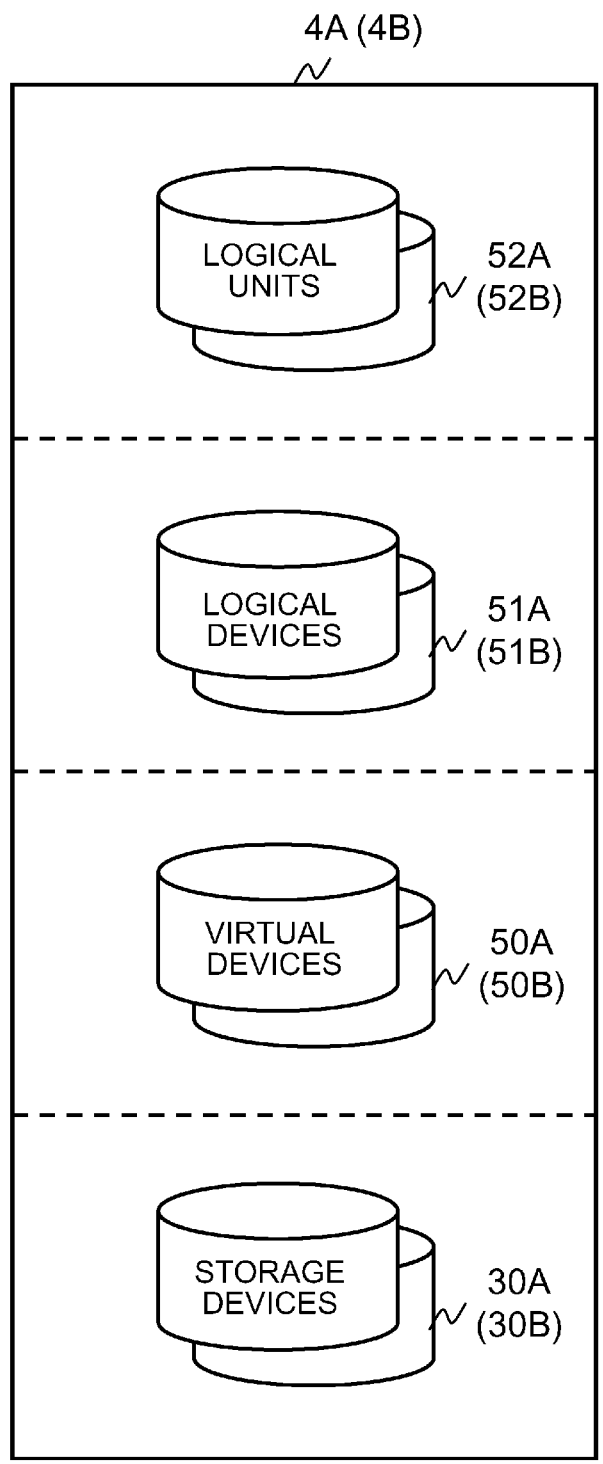
FIG. 2 is a configuration diagram showing a hierarchical structure of storage areas in a migration source storage apparatus and a migration destination storage apparatus.

FIG. 2 shows a hierarchical structure of storage areas in the migration source storage apparatus 4A and the migration destination storage apparatus 4B.

Referring to FIG. 2, the migration source storage apparatus 4A and the migration destination storage apparatus 4B provide storage areas, which are provided by the storage devices 30A, 30B, as logical units 52A, 52B to the host computer 2. A plurality of intermediate storage tiers for associating the storage devices 30A, 30B with the logical units 52A, 52B are provided between the storage devices 30A, 30B and the logical units 52A, 52B. Virtual devices 50A, 50B and logical devices 51A, 51B can be included in the intermediate storage tiers.

The virtual devices 50A, 50B constitute an intermediate storage tier for connecting the storage devices 30A, 30B, which constitute a lower storage tier of the virtual devices 50A, 50B, and the logical devices 51A, 51B which constitute a upper storage tier of the virtual devices 50A, 50B; and the virtual devices 50A, 50B are defined on storage areas provided by a RAID group constituted from the storage devices 30A, 30B.

The logical devices 51A, 51B constitute an intermediate storage tier for connecting the virtual devices 50A, 50B, which constitute a lower storage tier of the logical devices 51A, 51B, and the logical units 52A, 52B which constitute a upper storage tier of the logical devices 51A, 51B; and are storage areas obtained by gathering all or part of storage areas of one or more virtual devices 50A, 50B or extracting part of storage areas of the virtual devices 50A, 50B.

The logical units 52A, 52B are obtained by associating the logical devices 51A, 51B, which constitute a lower storage tier of the logical units 52A, 52B, with the host-side ports 44A, 44B. Even if the logical units 52A, 52B are mutually different logical units, if they have the same logical devices 51A, 51B in their lower storage tier, such logical units 52A, 52B provide the same data stored in the logical devices 51A, 51B via different host-side ports 44A, 44B to the host computer 2.

Incidentally, the migration source storage apparatus 4A and the migration destination storage apparatus 4B have a local copy function copying data stored in each logical device 51A, 51B to a different logical device 51A, 51B in the same storage apparatus. For example, the migration source storage apparatus 4A has a local copy function copying data stored in a copy-source logical device 51A from among the plurality of logical devices 51A to a copy-destination logical device 51A; and the migration destination storage apparatus 4B has a local copy function copying data stored in a copy-source logical device 51B from among the plurality of logical devices 51B to a copy-destination logical device 51B.

Furthermore, the migration source storage apparatus 4A and the migration destination storage apparatus 4B have an external connection function virtualizing logical devices in an external storage apparatus and providing them to the host computer 2. When the external connection function is used, a lower storage tier of the virtual devices 50A, 50B is constituted from logical units of the external storage apparatus.

Figure 3:
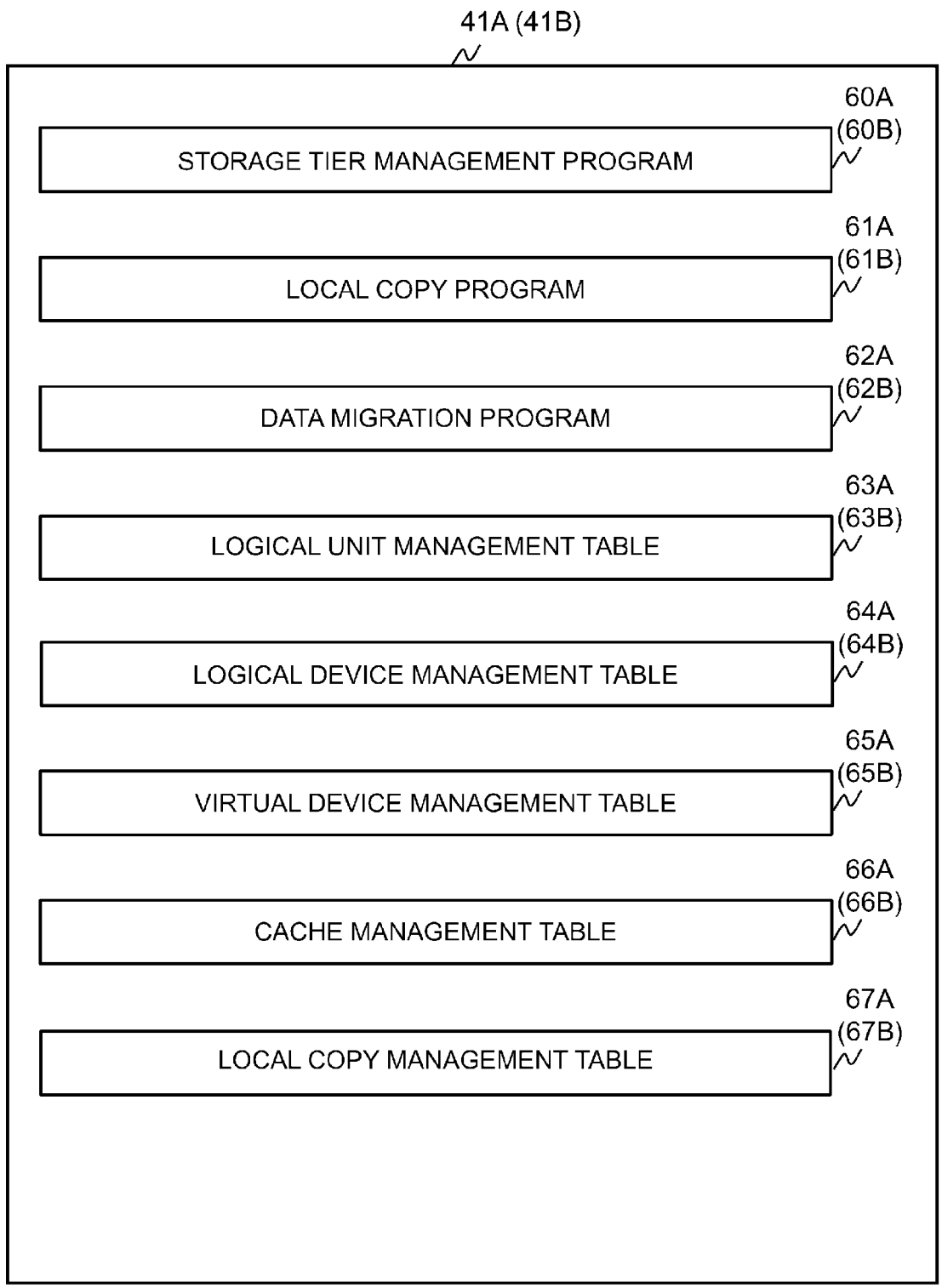
FIG. 3 is a data configuration diagram conceptually showing a data structure of a memory for the migration source storage apparatus and the migration destination storage apparatus.

FIG. 3 shows a data structure of the memory 41A, 41B for the migration source storage apparatus 4A or the migration destination storage apparatus 4B.

Referring to FIG. 3, the memory 41A, 41B stores a storage tier management program 60A, 60B, a local copy program 61A, 61B, a data migration program 62A, 62B, a logical unit management table 63A, 63B, a logical device management table 64A, 64B, a virtual device management table 65A, 65B, a cache management table 66A, 66B, and a local copy management table 67A, 67B.

The storage tier management program 60A, 60B is a program for managing a correspondence relationship between storage tiers in the migration source storage apparatus 4A or the migration destination storage apparatus 4B and executes various processing described later based on various information stored in the logical unit management table 63A, 63B, the logical device management table 64A, 64B, and the virtual device management table 65A, 65B.

The local copy program 61A, 61B is a program for implementing the local copy function in the migration source storage apparatus 4A or the migration destination storage apparatus 4B and executes processing for copying data, which is stored in the logical device (copy-source logical device) 51A, 51B, to a different logical device (copy-destination logical device) 51A, 51B in the same storage apparatus.

The data migration program 62A, 62B is a program for controlling data migration from the migration source storage apparatus 4A to the migration destination storage apparatus 4B. In this embodiment, the migration destination storage apparatus 4B copies data, which is stored in the storage devices 30A of the migration source storage apparatus 4A, to the storage devices 30B of the migration destination storage apparatus 4B based on the data migration program 62B.

Various processing by the migration source storage apparatus 4A and the migration destination storage apparatus 4B are performed by the control units 31A, 31B executing various programs stored in the memories 41A, 41B and may be hereinafter sometimes explained as processing by the migration source storage apparatus 4A or the migration destination storage apparatus 4B or processing by the various programs.

Figure 4:
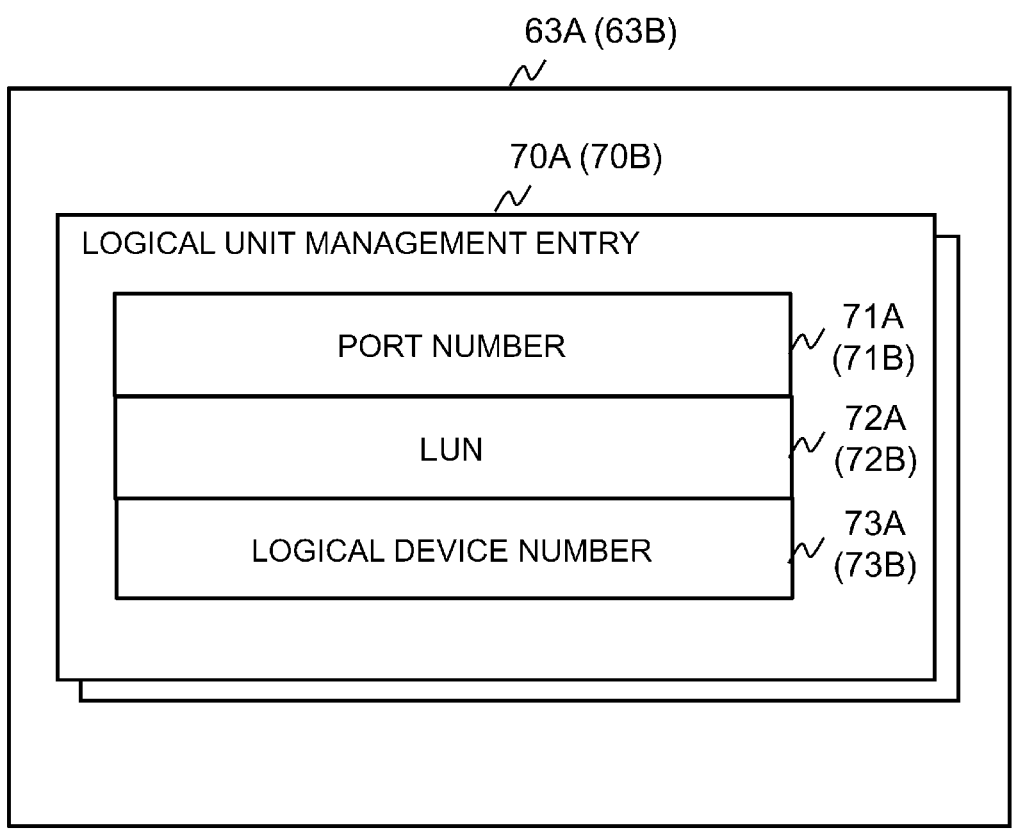
FIG. 4 is a data configuration diagram conceptually showing a data structure of a logical unit management table.

FIG. 4 shows a data structure of the logical unit management table 63A, 63B.

Referring to FIG. 4, the logical unit management table 63A, 63B is a table used by the storage tier management program 60A, 60B to manage the logical units 52A, 52B; and is composed of one or more logical unit management entries 85 provided corresponding to the individual logical units 52A, 52B respectively.

A port number 71A, 71B, an LUN 72A, 72B, and a logical device number 73A, 73B are registered in the logical unit management entry 70A, 70B. The port number 71A, 71B is identification information about the host-side ports 44A, 44B associated with the logical units 52A, 52B.

The LUN 72A, 72B is identification information about the relevant logical unit 52A, 52B and used to identify a plurality of logical units 52A, 52B associated with the same host-side port 44A, 44B. The logical device number 73A, 73B is identification information about the logical device 51A, 51B that constitutes the relevant logical unit 52A, 52B.

Figure 5:
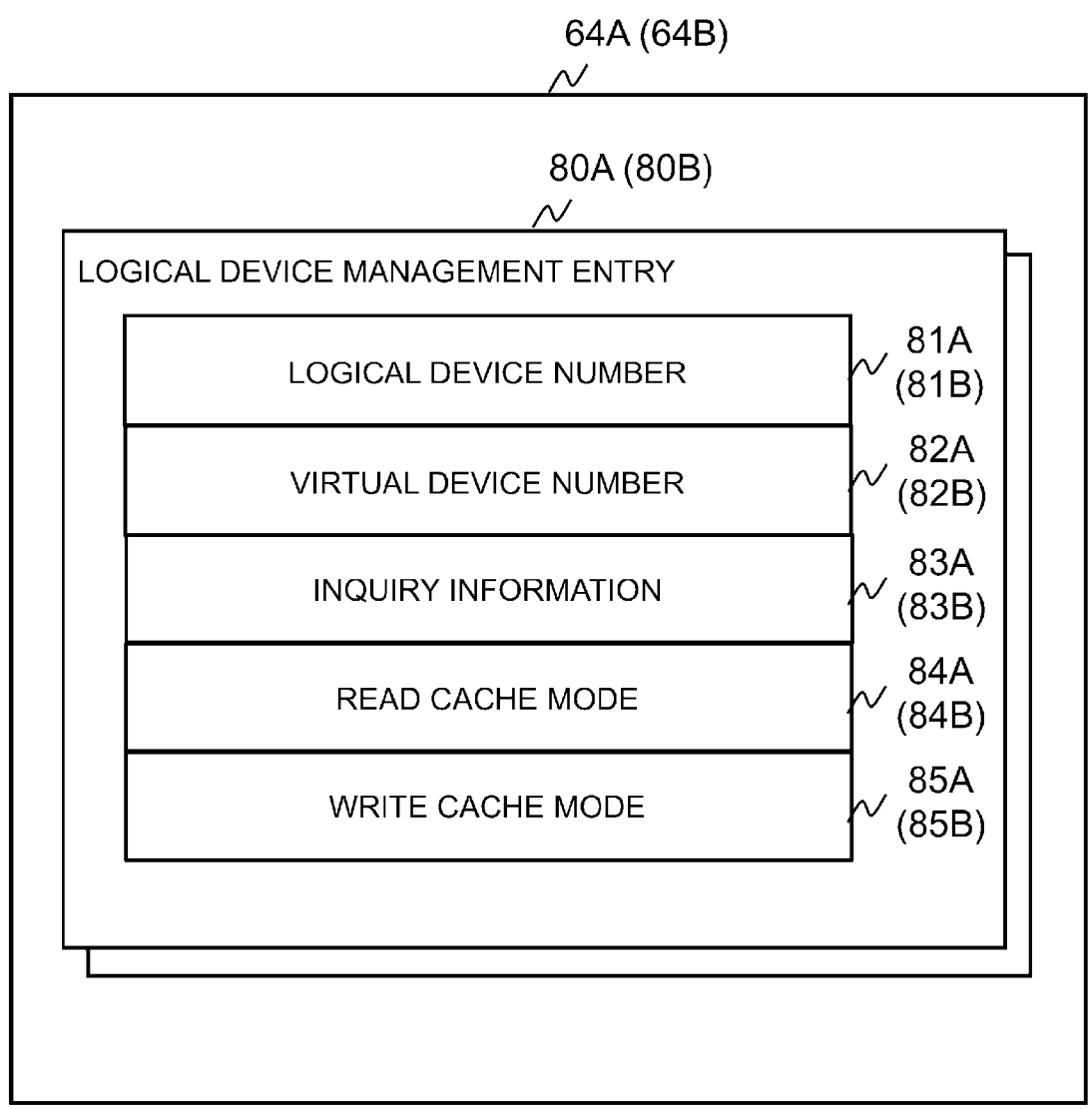
FIG. 5 is a data configuration diagram conceptually showing a data structure of a logical device management table.

FIG. 5 shows a data structure of the logical device management table 64A, 64B.

Referring to FIG. 5, the logical device management table 64A, 64B is a table used by the storage tier management program 60A, 60B to manage the logical devices 51A, 51B; and is composed of one or more logical device management entries 80A, 80B provided corresponding to the individual logical devices 51A, 51B respectively.

A logical device number 81A, 81B, a virtual device number 82A, 82B, inquiry information 83A, 83B, a read cache mode 84A, 84B, and a write cache mode 85A, 85B are registered in the logical device management entry 80A, 80B.

The logical device number 81A, 81B is identification information about the logical device 51A, 51B corresponding to the logical device management entry 80A, 80B; and the virtual device number 82A, 82B is identification information about the virtual device 50A, 50B that constitutes the relevant logical device 51A, 51B. The inquiry information 83A, 83B is information contained in an Inquiry command specified by the SCSI standards and includes, for example, identification information about the migration source storage apparatus 4A or the migration destination storage apparatus 4B and identification information about the logical device 51A, 51B.

The read cache mode 84A, 84B is information to manage operation modes that are set corresponding to the logical devices 51A, 51B; and is a flag that indicates whether or not a read cache mode is set to the relevant logical device 51A, 51B, and to which a value of either ON or OFF is set. If the read cache mode 84A, 84B is ON, when the migration source storage apparatus 4A or the migration destination storage apparatus 4B sends read data to the host computer 2, it temporarily stores the read data in the cache memory 43A, 43B; and if it later receives a read request for the same read data, it executes processing for sending the read data, which is stored in the cache memory 43A, 43B, to the host computer 2 (hereinafter sometimes referred to as the read-cache-on processing).

On the other hand, if the read cache mode 84A, 84B is OFF, when the migration source storage apparatus 4A or the migration destination storage apparatus 4B receives a read request from the host computer 2 and then sends read data to the host computer 2, it executes processing for always reading the read data from the storage devices 30A, 30B (or reads the read data from the external storage apparatus if the external connection function is used) and sending the read data, which has been read, to the host computer 2 (hereinafter sometimes referred to as the read-cache-off processing).

The write cache mode 85A, 85B is information to manage operation modes that are set corresponding to the logical devices 51A, 51B; and is a flag that indicates whether or not a write cache mode is set to the relevant logical device 51A, 51B, and to which a value of either ON or OFF is set. If the write cache mode 85A, 85B is ON, when the migration source storage apparatus 4A or the migration destination storage apparatus 4B receives write data from the host computer 2, it executes processing for temporarily storing the write data in the cache memory 43A, 43B and then sending a write response to the host computer 2 before storing the write data in the storage devices 30A, 30B (or before storing the write data in the external storage apparatus if the external connection function is used) (hereinafter sometimes referred to as the write-back or write-cache-on processing).

On the other hand, if the write cache mode 85A, 85B is OFF, when the migration source storage apparatus 4A or the migration destination storage apparatus 4B receives write data from the host computer 2, it executes processing for storing the write data in the storage devices 30A, 30B (or storing the write data in the external storage apparatus if the external connection function is used) and then sending a write response to the host computer 2 (hereinafter sometimes referred to as the write-through or write-cache-off processing).

Figure 6:
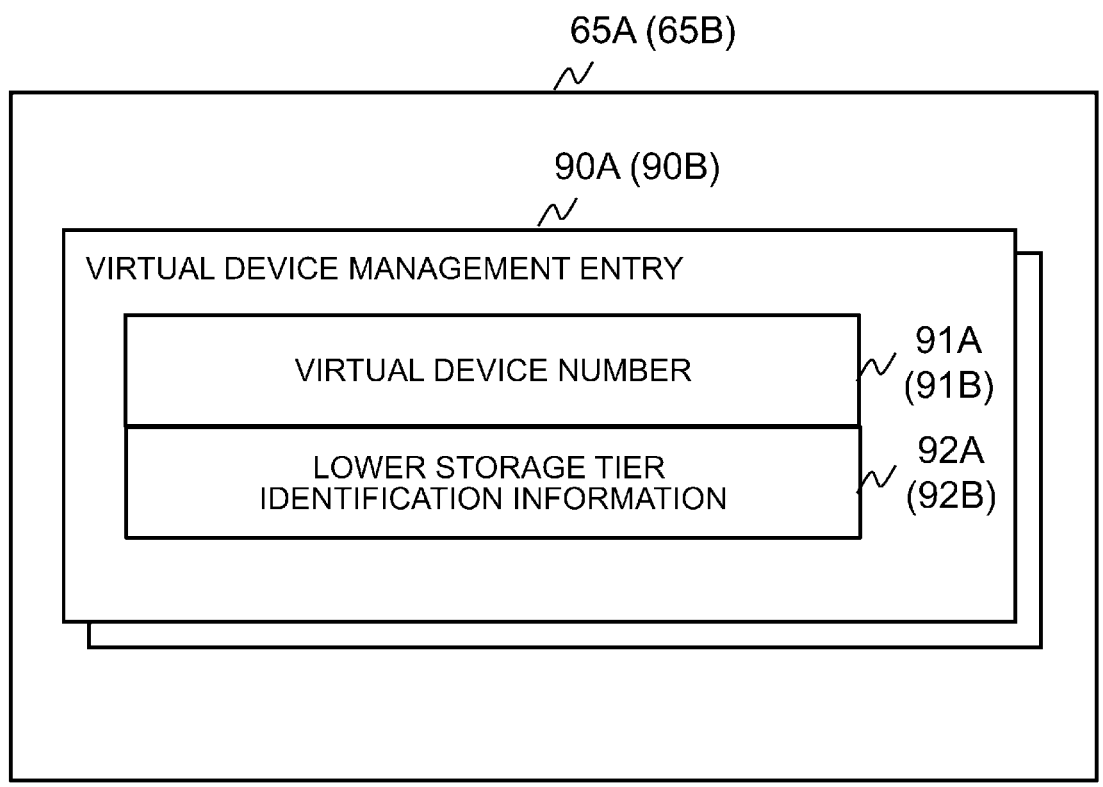
FIG. 6 is a data configuration diagram conceptually showing a data structure of a virtual device management table.

FIG. 6 shows a data structure of the virtual device management table 65A, 65B.

Referring to FIG. 6, the virtual device management table 65A, 65B is a table used by the storage tier management program 60A, 60B to manage the virtual devices 50A, 50B; and is composed of one or more virtual device management entries 90A, 90B provided corresponding to the individual virtual devices 50A, 50B respectively.

A virtual device number 91A, 91B, which is identification information about the relevant virtual device 50A, 50B, and a lower storage tier identification information 92A, 92B, which is identification information about the lower storage tier of that virtual device 50A, 50B, are registered in the virtual device management entry 90A, 90B.

For example, if the lower storage tier is the storage devices 30A, 30B, the identification information about the storage devices 30A, 30B is registered as the lower storage tier identification information 92A, 92B. On the other hand, if the lower storage tier is constituted from logical devices of the external storage apparatus, Fibre Channel addresses and LUNs of the logical units which provide data of the logical devices are registered as the lower storage tier identification information 92A, 92B.

Figure 7:
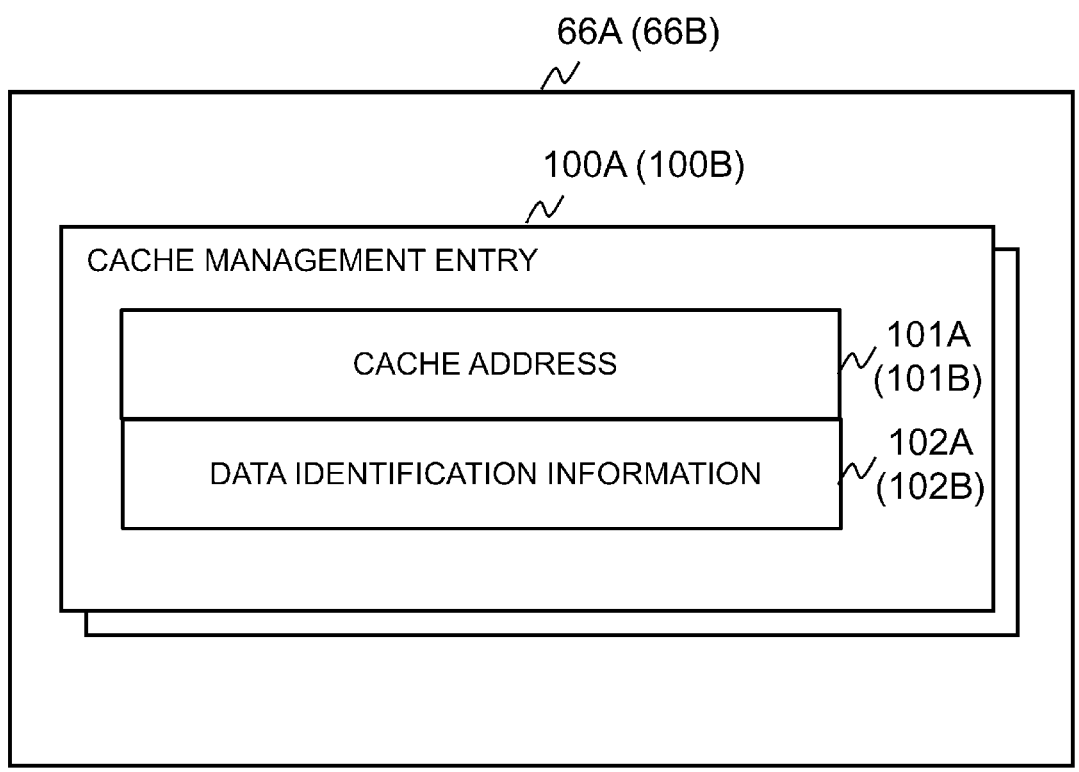
FIG. 7 is a data configuration diagram conceptually showing a data structure of a cache management table.

FIG. 7 shows a data structure of the cache management table 66A, 66B.

Referring to FIG. 7, the cache management table 66A, 66B is information to manage data temporarily stored in the cache memory 43A, 43B; and is composed of one or more cache management entries 100A, 100B provided corresponding to the individual cache memories 43A, 43B respectively.

A cache address 101A, 101B and data identification information 102A, 102B are registered in the cache management entry 100A, 100B. The cache address 101A, 101B is a starting address of a storage area in the cache memory 43A, 43B where the relevant data is stored.

Furthermore, the data identification information 102A, 102B is identification information about the relevant data and is generated from, for example, identification information about the logical device 51A, 51B storing the relevant data and a storage area of that logical device 51A, 51B where the relevant data is stored.

Figure 8:
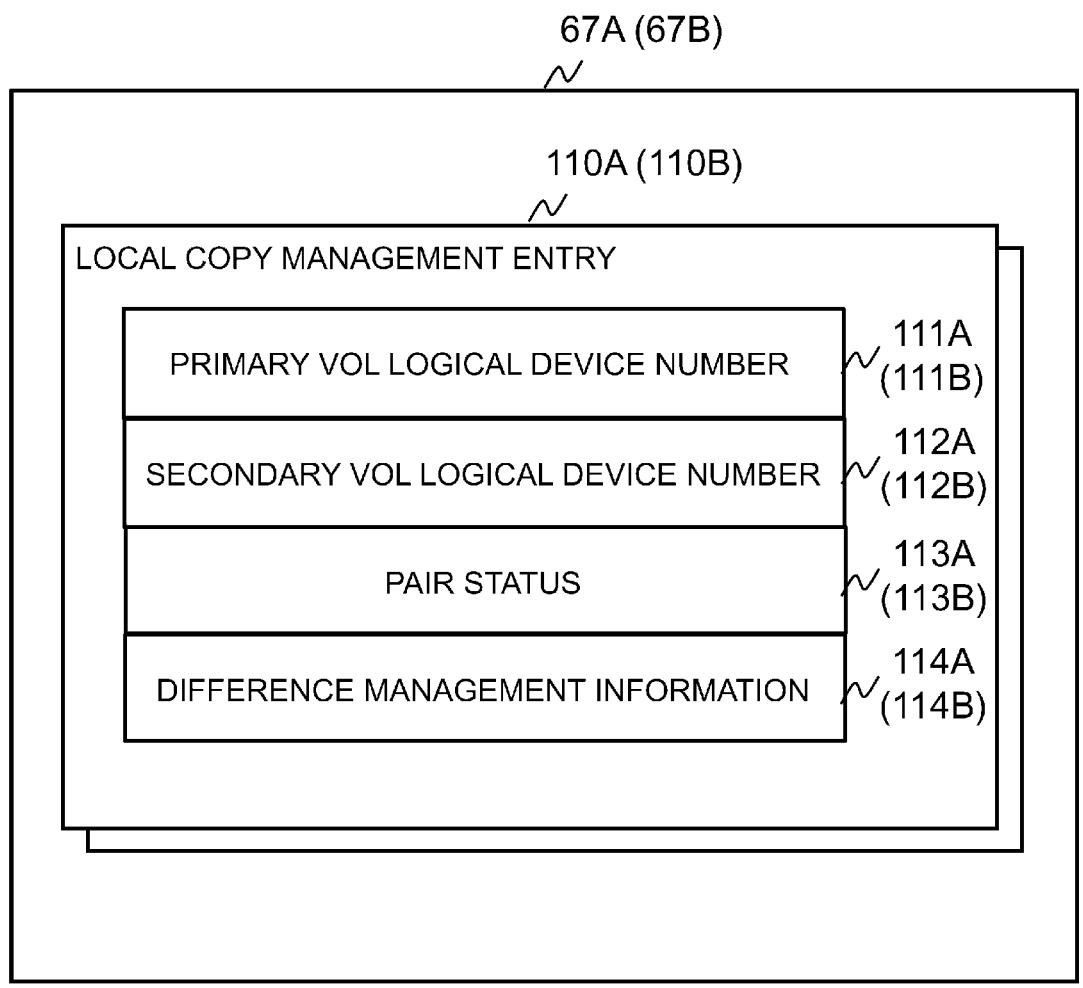
FIG. 8 is a data configuration diagram conceptually showing a data structure of a local copy management table.

FIG. 8 shows a data structure of the local copy management table 67A, 67B.

Referring to FIG. 8, the local copy management table 67A, 67B is information to manage processing by the local copy program 61A, 61B and is constituted form a primary-VOL logical device number 111A, 111B, a secondary-VOL logical device number 112A, 112B, a pair status 113A, 113B, and difference management information 114A, 114B. The primary-VOL logical device number is identification information about a copy-source logical device 51A, 51B and the secondary-VOL logical device number is identification information about a copy-destination logical device 51A, 51B.

The pair status 113A, 113B is information showing the status of processing executed by the local copy program 61A, 61B between the copy-source logical device 51A, 51B and the copy-destination logical device 51A, 51B and a value of either PAIR or PSUS is set as the pair status 113A, 113B.

If the pair status 113A, 113B is PAIR, the local copy program 61A, 61B is executing copy processing and a write request to the copy-destination logical device 51A, 51B is prohibited. If a write request is issued to the copy-source logical device 51A, 51B, the local copy program 61A, 61B copies write data to the copy-destination logical device 51A, 51B.

This copying may be executed synchronously or asynchronously with the write request. When copying is executed asynchronously, the local copy program 61A, 61B does not execute copying during processing for the write request and records, in the difference management information 114A, 114B, the occurrence of difference between the copy-source logical device 51A, 51B and the copy-destination logical device 51A, 51B with respect to storage areas corresponding to the write request. Then, at timing irrelevant to the write request, the local copy program 61A, 61B refers to the difference management information 114A, 114B and copies data of the area where the difference occurs, from the copy-source logical device 51A, 51B to the copy-destination logical device 51A, 51B.

If the pair status 113A, 113B is PSUS, the local copy program 61A, 61B suspends the copy processing and performs difference management of data of the copy-source logical device 51A, 51B and the copy-destination logical device instead. Also, a write request to the copy-destination logical device 51A, 51B is permitted.

If a write request is issued to the copy-source logical device 51A, 51B or the copy-destination logical device 51A, 51B, the local copy program 61A, 61B records, in the difference management information 114A, 114B, the occurrence of difference between the copy-source logical device and the copy-destination logical device with respect to storage areas corresponding to the write request.

Then, at timing when the pair status is changed from PSUS to PAIR, the local copy program 61A, 61B refers to the difference management information 114A, 114B and copies data of the area where the difference occurs, from the copy-source logical device 51A, 51B to the copy-destination logical device 51A, 51B. Specifically, when the pair status is changed from PSUS to PAIR, data of the copy-source logical device 51A, 51B can be made to correspond to data of the copy-destination logical device 51A, 51B by copying data of the area where the difference occurs, from the copy-source logical device 51A, 51B to the copy-destination logical device 51A, 51B.

The difference management information 114A, 114B is information to manage storage areas where the difference in data occurs between the copy-source logical device 51A, 51B and the copy-destination logical device 51A, 51B; and is, for example, a bitmap.

Figure 9:
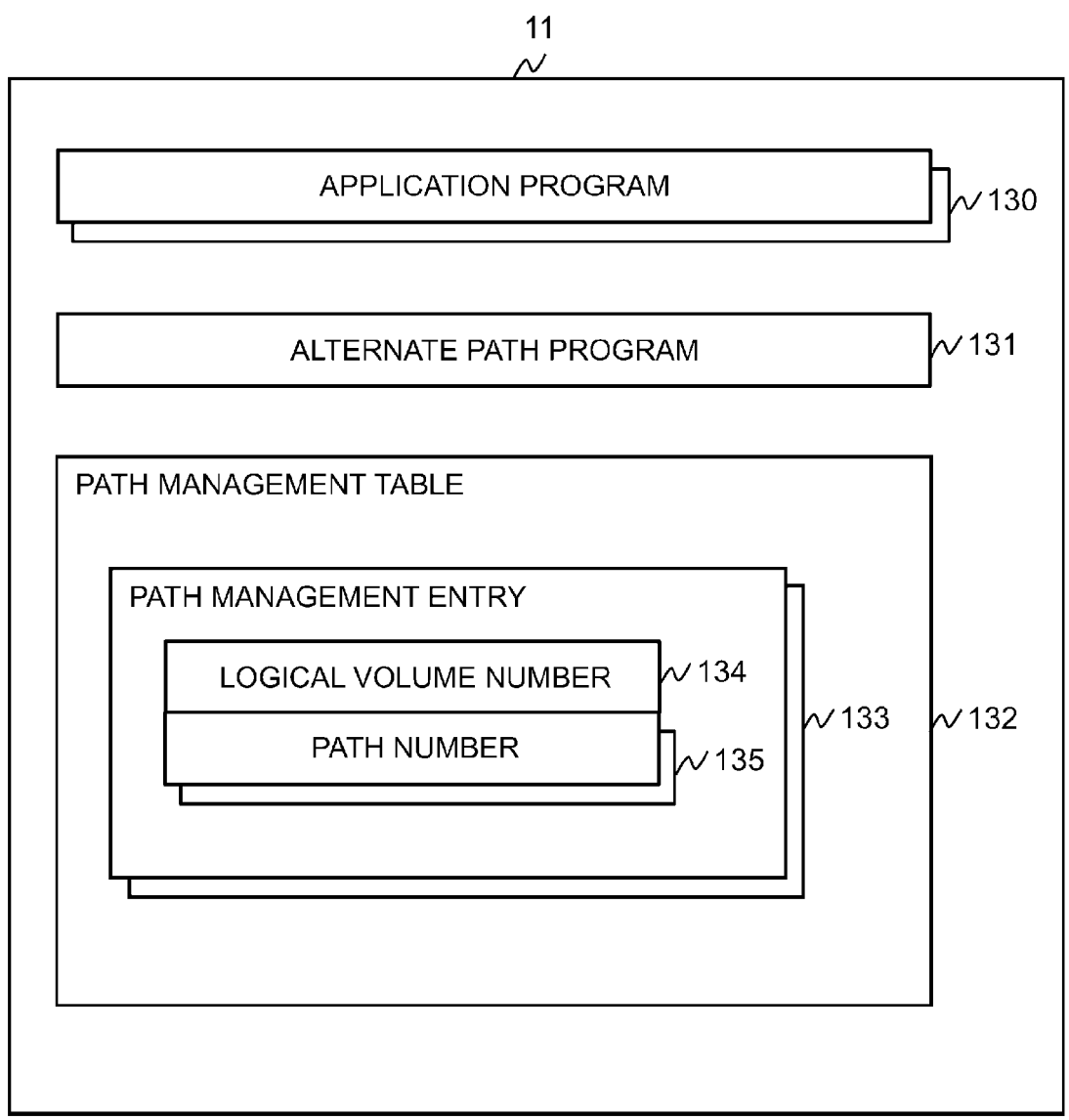
FIG. 9 is a data configuration diagram conceptually showing a data structure of a memory for a host computer.

FIG. 9 shows a data structure of the memory 11 for the host computer 2.

Referring to FIG. 9, the memory 11 stores a plurality of application programs 130, an alternate path program 131, and a path management table 132.

The application programs 130 are programs for executing processing according to business activities of users; and reads/writes data from/to the logical units 52A or the logical units 52B via logical volumes allocated to them by the alternate path program 131.

The alternate path program 131 is a program for issuing an input/output request to the migration source storage apparatus 4A or the migration destination storage apparatus 4B based on various information registered in the path management table 132.

The path management table 132 is a table for managing an input/output request receiver of the alternate path program 131; and is composed of one or more path management entries 133 corresponding to the individual logical volumes.

A logical volume number 134 which is identification information about the relevant logical volume, and a path number 135 which is identification information about each path connected to that logical volume are registered in the path management entry 133. If a plurality of paths are set because of a redundancy configuration, a plurality of path numbers 135 are registered in the path management entry 133.

A plurality of paths which are set to one logical volume do not have to be paths to the same logical unit and may be paths to logical units which return the same response to an Inquiry command. Accordingly, they may be paths to logical units in different storage apparatuses as long as they are paths to logical units returning the same response to an Inquiry command.

When issuing an input/output request to the migration source storage apparatus 4A or the migration destination storage apparatus 4B, the alternate path program 131 refers to the path management table 132, selects one path from among a plurality of paths associated with the relevant logical volume, and issues the input/output request via the selected path to the migration source storage apparatus 4A or the migration destination storage apparatus 4B. After registration of a path management entry 133 corresponding to a new path in the path management table 132, that path becomes a candidate to be selected by the alternate path program 131. If the registration of the path management entry in the path management table 52 is cancelled, the path corresponding to the canceled path management entry is removed from the candidates to be selected by the alternate path program 131.

Incidentally, the alternate path program 131 is provided as a standard function by, for example, the operating system of the host computer 2 and does not have to be capable of performing special control beyond the above-described range.

Figure 10:
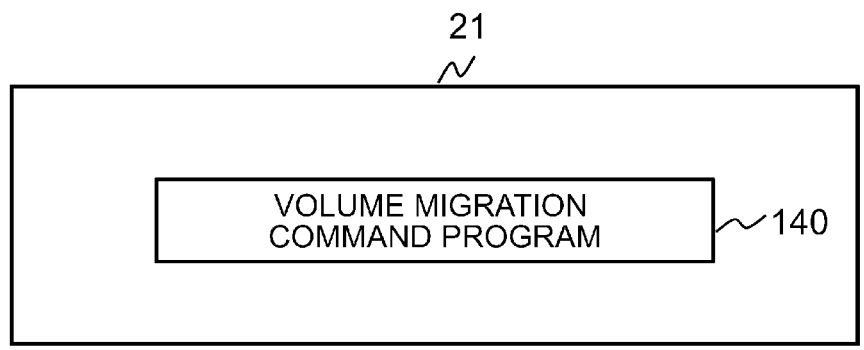
FIG. 10 is a data configuration diagram conceptually showing a data structure of a memory for a management computer.

FIG. 10 shows a data structure of the memory 21 for the management computer 3.

Referring to FIG. 10, the memory 21 stores a volume migration command program 140. The volume migration command program 140 is a program for controlling volume migration between the migration source storage apparatus 4A and the migration destination storage apparatus 4B; and gives a necessary command to the host computer 2 and the migration destination storage apparatus 4B at the time of volume migration.

(1-2) Volume Migration Processing in this Computer System (1-2-1) Outline of Volume Migration Processing in this Computer System Next, the outline of processing executed in the computer system 1 for migrating volumes, to which the local copy function is applied, from the migration source storage apparatus 4A to the migration destination storage apparatus 4B will be explained with reference to FIG. 11 to FIG. 13.

In this embodiment, migration source volumes are two logical devices 51A in the migration source storage apparatus 4A and copy processing between the two logical devices 51A is executed by the local copy program 61A (hereinafter sometimes referred to as the local copy processing). A copy-source logical device 51A of this copy processing will be hereinafter referred to as the primary migration source VOL 150A and a copy-destination logical device 51A will be referred to as the secondary migration source VOL 151A.

Furthermore, in this embodiment, migration destination volumes are two logical devices 51B in the migration destination storage apparatus 4B. The logical device 51B which is a migration destination of the primary migration source VOL 150A will be hereinafter referred to as the primary migration destination VOL 150B and the logical device 51B which is a migration destination of the secondary migration source VOL 151A will be hereinafter referred to as the secondary migration destination VOL 151B.

The volume migration processing according to this embodiment includes three steps of: input/output request receiver migration processing for migrating an input/output request receiver of the host computer 2 from the migration source storage apparatus 4A to the migration destination storage apparatus 4B; copy processing migration processing for migrating the copy processing, which is executed in the migration source storage apparatus 4A, to the migration destination storage apparatus 4B (hereinafter sometimes referred to as the copy processing control information migration processing); and data migration processing for migrating data, which is stored in the migration source storage apparatus 4A, to the migration destination storage apparatus 4B.

Figure 11:
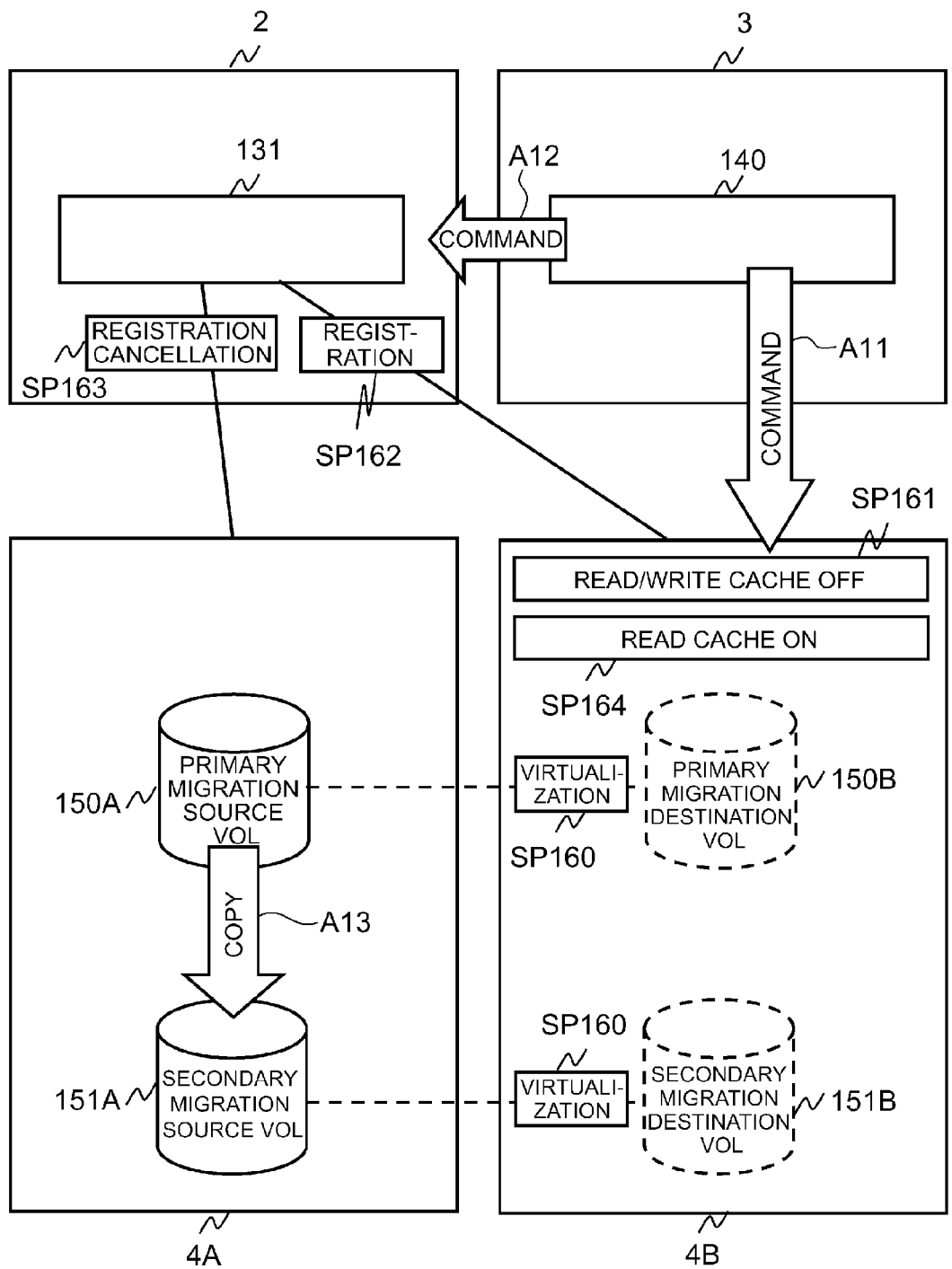
FIG. 11 is a schematic diagram conceptually showing input/output request receiver migration processing.

FIG. 11 conceptually shows the input/output request receiver migration processing according to the first embodiment.

Referring to FIG. 11, this input/output request receiver migration processing is executed by the host computer 2 and the migration destination storage apparatus 4B, each of which performs necessary processing in accordance with commands given from the management computer 3 to the host computer 2 and the migration destination storage apparatus 4B respectively.

Firstly, the migration destination storage apparatus 4B virtualizes the primary migration source VOL 150A and the secondary migration source VOL 151A as the primary migration destination VOL 150B and the secondary migration destination VOL 151B, respectively, in accordance with a command (A11) given from the management computer 3 (SP160).

Next, the migration destination storage apparatus 4B sets off the read cache mode and the write cache mode of the primary migration destination VOL 150B and the secondary migration destination VOL 151B, respectively (SP161). As a result of the above-described processing, the host computer 2 can issue an input/output request to the primary migration source VOL 150A and the secondary migration source VOL 151A via the migration destination storage apparatus 4B in a state where data integrity is maintained.

In this case, the primary migration source VOL 150A and the primary migration destination VOL 150B are externally connected via the port 44A, the SAN 5, and the port 44B; and the secondary migration source VOL 151A and the secondary migration destination VOL 151B are externally connected via the port 44A, the SAN 5, and the port 44B. So, for example, if a write request is issued from the host computer 2 to the migration destination storage apparatus 4B, on condition that the write cache mode is OFF, write data is reflected in the primary migration source VOL 150A and the secondary migration source VOL 151A.

Next, the host computer 2 registers a path to a logical volume corresponding to the primary migration destination VOL 150B and the secondary migration destination VOL 151B as an alternate path to a logical volume corresponding to the primary migration source VOL 150A and the secondary migration source VOL 151A in accordance with a command (A12) from the management computer 3 (SP162).

Next, the host computer 2 cancels the registration of the path to the primary migration source VOL 150A and the secondary migration source VOL 151A via the alternate path to the abovementioned logical volume (SP163). As a result of the above-described processing, the input/output request receiver of the host computer 2 can be migrated from the migration source storage apparatus 4A to the migration destination storage apparatus 4B by using the path registration and the path registration cancellation which are standard functions of the alternate path program 131.

Subsequently, the migration destination storage apparatus 4B sets on the read cache mode of the primary migration destination VOL 150B and the secondary migration destination VOL 151B respectively in accordance with a command (A11) from the management computer 3 (SP164). As a result of this processing, the migration destination storage apparatus 4B can process a read request at a high speed by using the read cache during subsequent copy processing migration processing and data migration processing. During execution of step SP160 to step SP164, copy processing for copying data, which is stored in the primary migration source VOL 150A, to the secondary migration source VOL 151A (A13) is executed in the migration source storage apparatus 4A.

Figure 12:
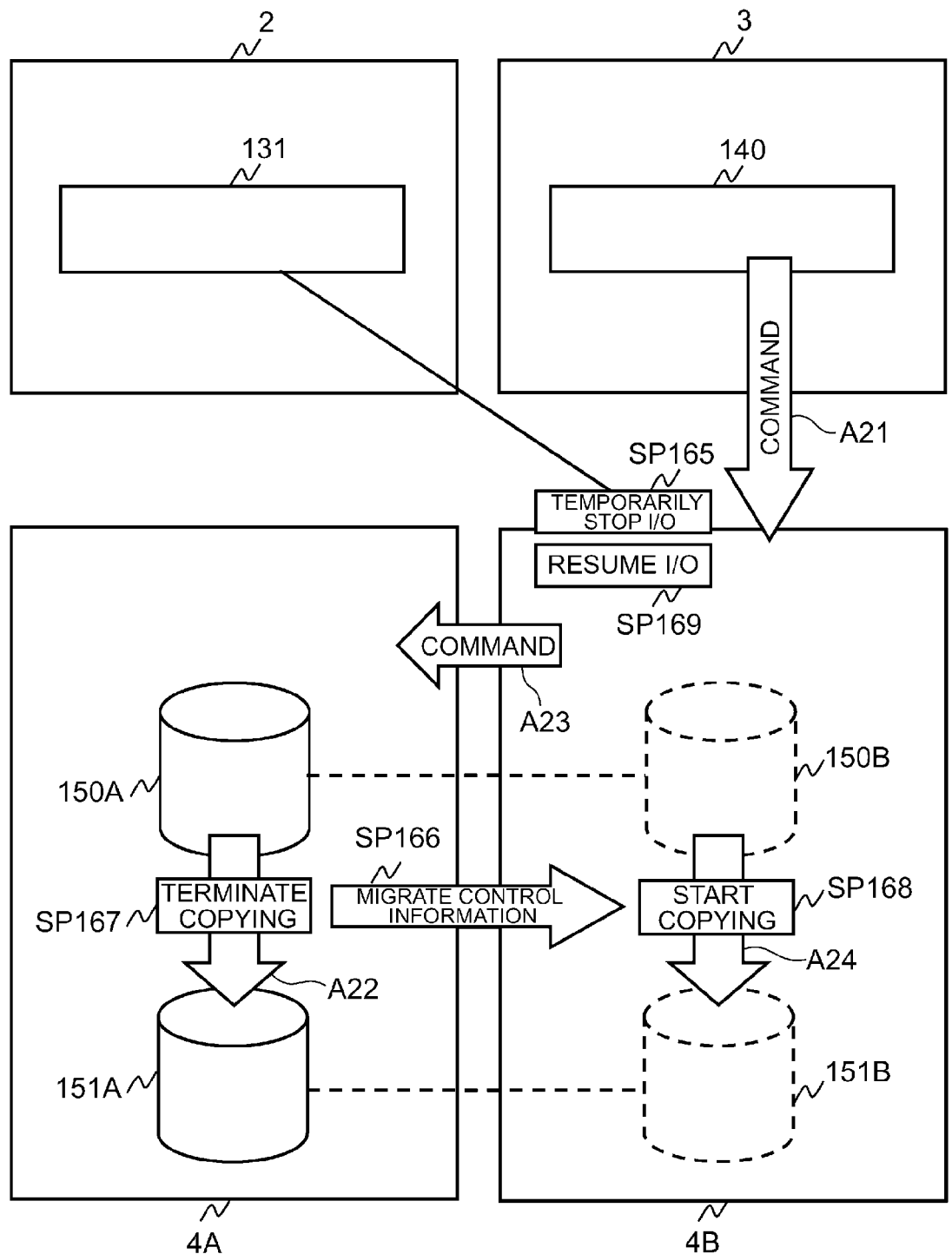
FIG. 12 is a schematic diagram conceptually showing local copy migration processing.

FIG. 12 conceptually shows the copy processing migration processing according to the first embodiment.

Referring to FIG. 12, this copy processing migration processing is executed by the migration source storage apparatus 4A and the migration destination storage apparatus 41B, each of which executes necessary processing in accordance with a command given from the management computer 3 to the migration destination storage apparatus 4B and a command given from the migration destination storage apparatus 4B to the migration source storage apparatus 4A.

Firstly, the migration destination storage apparatus 4B temporarily stops processing of an input/output request from the host computer 2 in accordance with a command (A21) given from the management computer 3 (SP165).

Next, the migration destination storage apparatus 4B obtains control information for copy processing (A22) between the primary migration source VOL 150A and the secondary migration source VOL 151A from the migration source storage apparatus 4A (SP166). As a result of the above-described processing, the migration destination storage apparatus 4B can obtain the control information for the copy processing (A22) between the primary migration source VOL 150A and the secondary migration source VOL 151A from the migration source storage apparatus 4A while maintaining integrity.

Subsequently, the migration source storage apparatus 4A terminates the copy processing (A22) between the primary migration source VOL 150A and the secondary migration source VOL 151A in accordance with a command (A23) from the migration destination storage apparatus 4B (SP167).

Next, the migration destination storage apparatus 4B starts copy processing (A24) between the primary migration destination VOL 150B and the secondary migration destination VOL 151B by using the control information obtained in SP166 (SP168). As a result of the above-described processing, the migration destination storage apparatus 4B can continue the copy processing (A22) between the primary migration source VOL 150A and the secondary migration source VOL 151A in the migration source storage apparatus 4A as the copy processing (A24) between the primary migration destination VOL 150B and the secondary migration destination VOL 151B.

Then, the migration destination storage apparatus 4B resumes the processing of the input/output request from the host computer 2 (SP169). As a result of this processing, the length of time to stop the input/output request processing can be limited to a short period of time from SP165 (when the input/output request processing is temporarily stopped) to SP169 (when the input/output request processing is resumed).

As a result, temporary cessation of the input/output request processing can be concealed from the application programs 130 by reissuing of the input/output request by the alternate path program 131.

Figure 13:
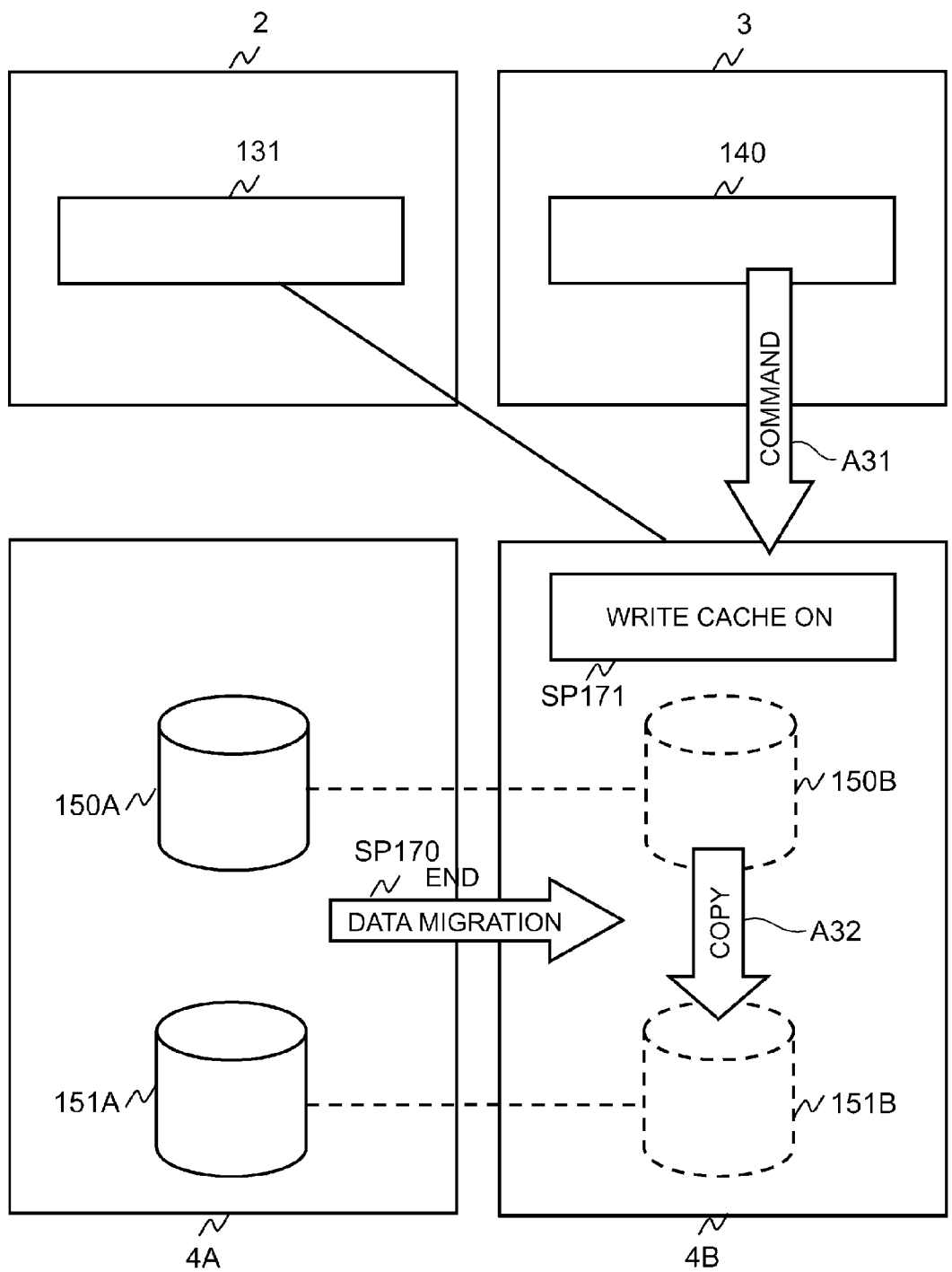
FIG. 13 is a schematic diagram conceptually showing data migration processing.

FIG. 13 conceptually shows the data migration processing according to the first embodiment.

Referring to FIG. 13, this data migration processing is executed by the migration destination storage apparatus 4B, which executes necessary processing in accordance with a command given from the management computer 3 to the migration destination storage apparatus 4B.

Firstly, the migration destination storage apparatus 4B migrates data, which are stored in the primary migration source VOL 150A and the secondary migration source VOL 151A, to the primary migration destination VOL 150B and the secondary migration destination VOL 151B, respectively, in accordance with a command (A31) from the management computer 3 (SP170).

Next, the migration destination storage apparatus 4B changes the write cache mode from OFF to ON for each of the primary migration destination VOL 150B and the secondary migration destination VOL 151B (SP171). By keeping the write cache mode off until immediately before SP171, write-through processing is executed on the primary migration source VOL 150A and the secondary migration source VOL 151A until immediately before SP171. So, the latest data can be retained in the primary migration source VOL 150A and the secondary migration source VOL 151A. Therefore, if a failure occurs in the migration destination storage apparatus 4B during the volume migration processing, it is possible to return to the use of the primary migration source VOL 150A and the secondary migration source VOL 151A where the latest data is retained.

(1-2-2) Specific Processing of Each Program

Next, the processing content of various processing related to the volume migration processing according to this embodiment will be explained below in more detail with reference to FIG. 14 to FIG. 22.

(1-2-2-1) Volume Migration Command Processing

Figure 14:
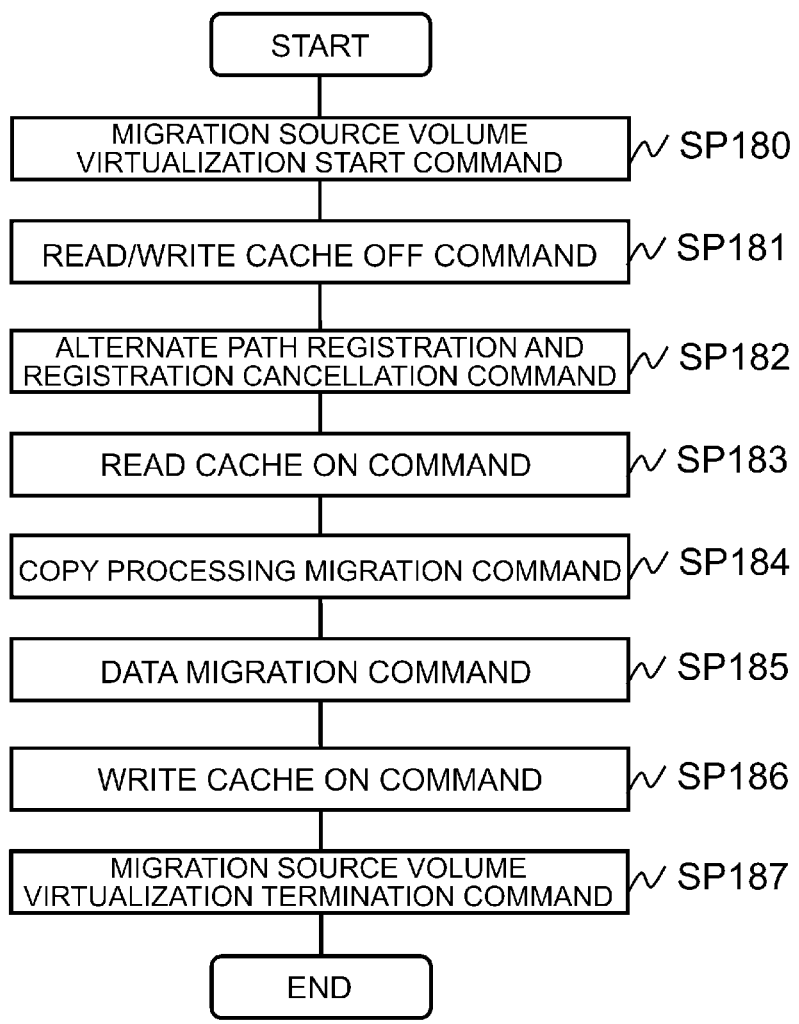
FIG. 14 is a flowchart showing a processing sequence for volume migration command processing.

FIG. 14 shows a processing sequence for volume migration command processing executed by the volume migration command program 140 in relation to the volume migration processing according to this embodiment.

Referring to FIG. 14, when the volume migration command program 140 for the management computer 3 receives a command for migration of the primary migration source VOL 150A and the secondary migration source VOL 151A from a system administrator via the input device 24, it starts the following processing.

The volume migration command program 140 gives a command to the host computer 2 or the migration destination storage apparatus 4B in each step of FIG. 14. Having received the command, the host computer 2 or the storage apparatus 4B executes processing in accordance with that command; and after the completion of the processing, the host computer 2 or the storage apparatus 4B sends completion notice to the volume migration command program 140. After receiving the completion notice from the host computer 2 or the storage apparatus 4B, the volume migration command program 140 proceeds to the next step.

Firstly, the volume migration command program 140 gives a command to start virtualization of the primary migration source VOL 150A and the secondary migration source VOL 151A (hereinafter referred to as the migration source volume virtualization start command) (SP180).

Next, the volume migration command program 140 gives a command to the migration destination storage apparatus 4B to set off the read cache mode and the write cache mode of the primary migration destination VOL 150B and the secondary migration destination VOL 151B (hereinafter referred to as the read/write cache off command) (SP181).

Subsequently, the volume migration command program 140 gives a command to the host computer 2 to register a path to the migration destination storage apparatus 4B as an alternate path to a logical volume corresponding to the primary migration source VOL 150A and the secondary migration source VOL 151A and cancels registration of a path to the migration source storage apparatus 4A (hereinafter referred to as the alternate path registration and registration cancellation command) (SP182).

Then, the volume migration command program 140 gives a command to the migration destination storage apparatus 4B to set on the read cache mode of the primary migration destination VOL 150B and the secondary migration destination VOL 151B (hereinafter referred to as the read-cache-on command) (SP183).

Next, the volume migration command program 140 gives a command to the migration destination storage apparatus 4B to migrate the copy processing between the primary migration source VOL 150A and the secondary migration source VOL 151A from the migration source storage apparatus 4A to the migration destination storage apparatus 4B (hereinafter referred to as the copy processing migration command) (SP184).

Subsequently, the volume migration command program 140 gives a command to the migration destination storage apparatus 4B to migrate data of the primary migration source VOL 150A and the secondary migration source VOL 151A to the primary migration destination VOL 150B and the secondary migration destination VOL 151B, respectively (hereinafter referred to as the data migration command) (SP185).

Then, the volume migration command program 140 gives a command to the migration destination storage apparatus 4B to set on the write cache mode of the primary migration destination VOL 150B and the secondary migration destination VOL 151B (hereinafter referred to as the write-cache-on command) (SP186).

Finally, the volume migration command program 140 gives a command to the migration destination storage apparatus 4B to terminate the virtualization of the primary migration source VOL 150A and the secondary migration source VOL 151A (hereinafter referred to as the migration source volume virtualization termination command) (SP187).

(1-2-2-2) Migration Source Volume Virtualization Start Processing

Figure 15:
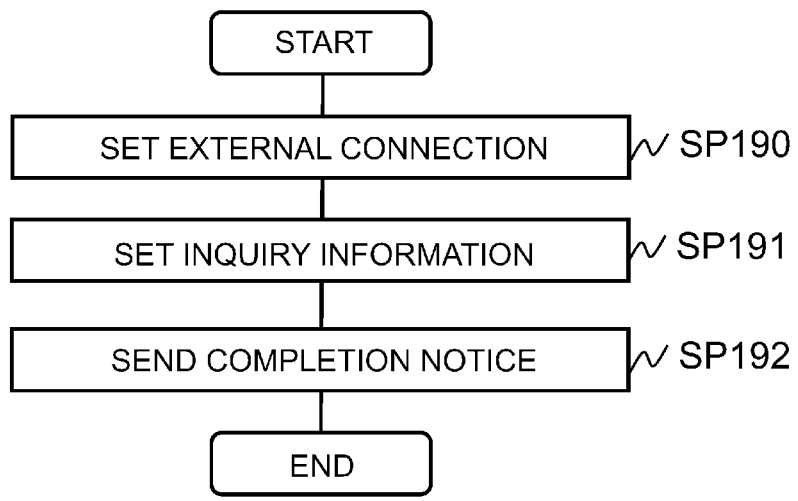
FIG. 15 is a flowchart showing a processing sequence for migration source volume virtualization start processing.

FIG. 15 shows a processing sequence for processing executed by the migration destination storage apparatus 4B which received the migration source volume virtualization start command in step SP180 of the volume migration command processing. The processing for starting virtualization of the primary migration source VOL 150A will be explained below; however, it should be noted that the same processing is executed on the secondary migration source VOL 151A.

Firstly, the migration destination storage apparatus 4B makes settings to virtualize the primary migration source VOL 150A and provide the primary migration source VOL 150A as the primary migration destination VOL 150B to the host computer 2 (SP190).

Specifically speaking, the storage tier management program 60B for the migration destination storage apparatus 4B adds a new virtual device management entry 90B to the virtual device management table 65B and registers the Fibre Channel address and LUN of the logical unit 52A, which provides data of the primary migration source VOL 150A, as the lower storage tier identification information 92B of the virtual device management entry 90B. The storage tier management program 60B then adds a new logical device management entry 80B corresponding to the primary migration destination VOL 150B to the logical device management table 64B and registers the virtual device number 91B of the newly added virtual device entry 90B as the virtual device number 82B of this logical device management entry 80B.

Next, the migration destination storage apparatus 4B makes settings to make a response to an Inquiry command to the primary migration destination VOL 150B to be the same as a response to an Inquiry command to the primary migration source VOL 150A (SP191).

Specifically speaking, the storage tier management program 60B for the migration destination storage apparatus 4B sends an Inquiry command to the primary migration source VOL 150A and registers information, which is contained in the Inquiry command (for example, the logical device number of the logical device 51A constituting the logical unit 52A), in the inquiry information 83B of the logical device management entry 80B corresponding to the primary migration destination VOL 150B.

As a result of steps SP190 and SP191, the alternate path program 131 can register a path to the logical unit 52A, which provides data of the primary migration source VOL 150A, and a path to the logical unit 52B, which provides data of the primary migration destination VOL 150B, as an alternate path to the same logical volume.

After the completion of the processing for starting virtualization of both the primary migration source VOL 150A and the secondary migration source VOL 151A, the migration destination storage apparatus 4B sends completion notice to the volume migration command program 140 (SP192).

As a result of the above-described processing, the primary migration source VOL 150A and the primary migration destination VOL 150B are externally connected via the port 44A, the SAN 5, and the port 44B; and the secondary migration source VOL 151A and the secondary migration destination VOL 151B are externally connected via the port 44A, the SAN 5, and the port 44B.

(1-2-2-3) Read/Write Cache Off Processing

Figure 16:
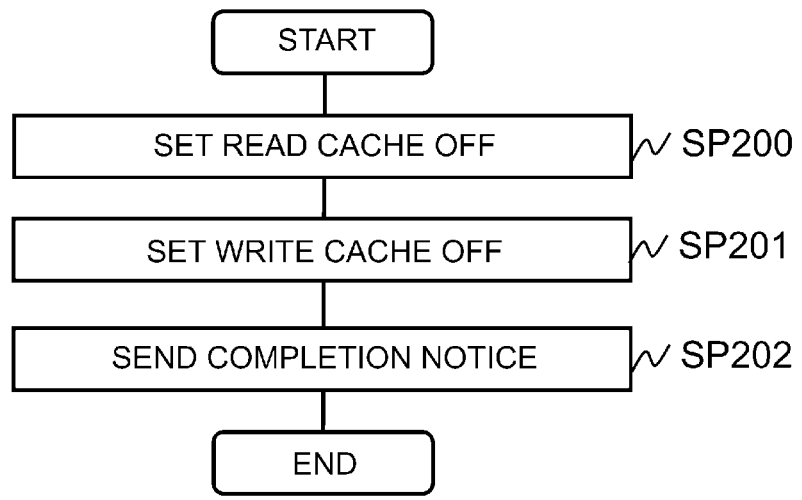
FIG. 16 is a flowchart showing a processing sequence for read/write cache off processing.

FIG. 16 shows a processing sequence for the processing executed by the migration destination storage apparatus 4B which received the read/write cache off command in step SP181 of the volume migration command processing. The processing for setting off the read cache mode and the write cache mode of the primary migration destination VOL 150B will be explained below; however, the same processing will be also executed on the secondary migration destination VOL 151B.

Firstly, the migration destination storage apparatus 4B sets off the read cache mode of the primary migration destination VOL 150B (SP200).

Specifically speaking, the storage tier management program 60B for the migration destination storage apparatus 4B registers OFF for the read cache mode 84B of the logical device management entry 80B corresponding to the primary migration destination VOL 150B.

Next, the migration destination storage apparatus 4B sets off the write cache mode of the primary migration destination VOL 150B (SP201).

Specifically speaking, the storage tier management program 60B for the migration destination storage apparatus 4B registers OFF for the write cache mode 85B of the logical device management entry 80B corresponding to the primary migration destination VOL 150B.

After the completion of the processing for setting off the read cache mode and the write cache mode of both the primary migration destination VOL 150B and the secondary migration destination VOL 151B, the migration destination storage apparatus 4B sends completion notice to the volume migration command program 140 (SP202).

(1-2-2-4) Alternate Path Registration and Registration Cancellation Processing

Figure 17:
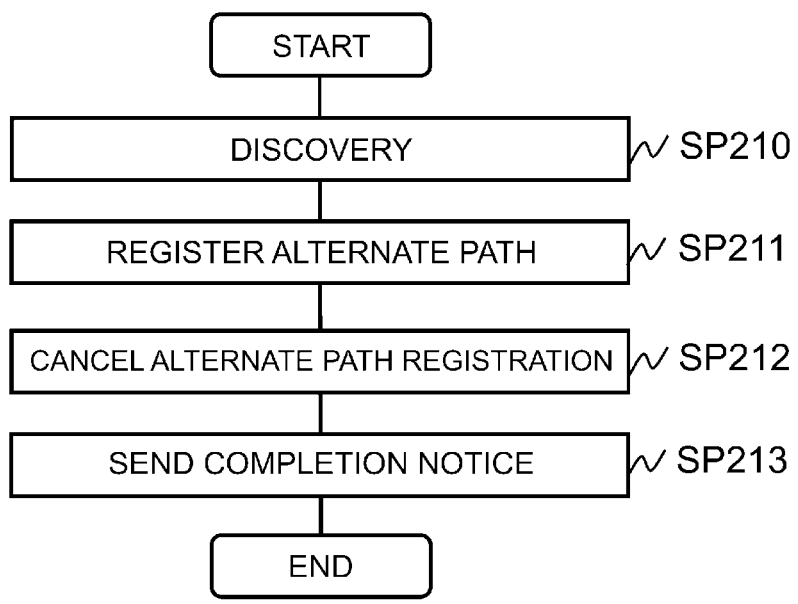
FIG. 17 is a flowchart showing a processing sequence for alternate path registration and registration cancellation processing.

FIG. 17 shows a processing sequence for the processing executed by the host computer 2 which received the alternate path registration and registration cancellation command in step SP182 of the volume migration command processing. The processing for registering, and cancelling the registration of, the alternate path to the logical volume corresponding to the primary migration source VOL 150A will be explained below; however, the same processing will be also executed on the secondary migration source VOL 151A.

Firstly, the host computer 2 executes discovery processing for obtaining a list of logical units 52B provided by the migration destination storage apparatus 4B to the host computer 2 (SP210).

Next, the host computer 2 registers a path to the primary migration destination VOL 150B as a path to the logical volume corresponding to the primary migration source VOL 150A based on the list of logical units 52B obtained by the discovery processing (SP211).

Specifically speaking, the alternate path program 131 adds a new path number 135 to the path number 135 of the path management entry 133 corresponding to the primary migration source VOL 150A and registers identification information about the path to the logical unit 52B which provides data of the primary migration destination VOL 150B.

Next, the host computer 2 refers to the path to the logical volume corresponding to the primary migration source VOL 150A and cancels the registration of the path to the primary migration source VOL 150A (SP212).

Specifically, the alternate path program 131 deletes the path number 135 of the path management entry 133 corresponding to the primary migration source VOL 150A and cancels the registration of the identification information about the path to the logical unit which provides data of the primary migration source VOL 150A.

After completing the processing for registration and cancellation registration of the alternate paths to the logical volume corresponding to both the primary migration source VOL 150A and the secondary migration source VOL 151A, the host computer 2 sends completion notice to the volume migration command program 140 (SP213).

(1-2-2-5) Read-Cache-On Processing

Figure 18:
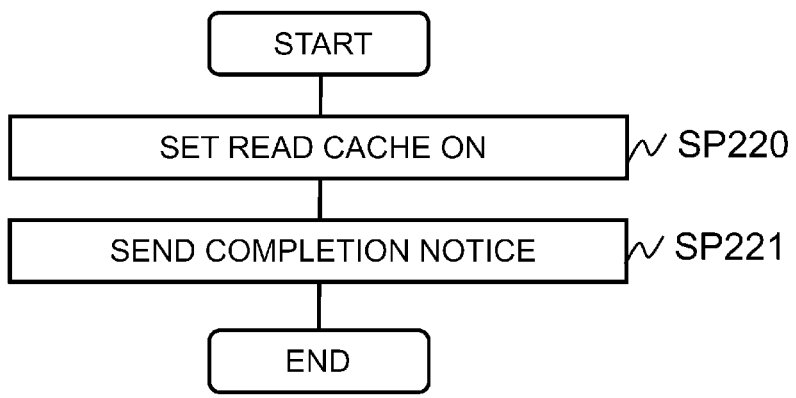
FIG. 18 is a flowchart showing a processing sequence for read-cache-on processing.

FIG. 18 shows a processing sequence for the processing executed by the migration destination storage apparatus 4B which received the read-cache-on command in step SP183 of the volume migration command processing. The processing for setting on the read cache mode of the primary migration destination VOL 150B will be explained below; however, the same processing will be also executed on the secondary migration destination VOL 151B.

Firstly, the migration destination storage apparatus 4B sets on the read cache mode of the primary migration destination VOL 150B (SP220).

Specifically speaking, the storage tier management program 60B for the migration destination storage apparatus 4B registers ON for the read cache mode 84B of the logical device management entry 80B corresponding to the primary migration destination VOL 150B.

After completing the processing for setting on the read cache mode of both the primary migration destination VOL 150B and the secondary migration destination VOL 151B, the migration destination storage apparatus 4B sends completion notice to the volume migration command program 140 (SP221).

(1-2-2-6) Local Copy Migration Processing

Figure 19:
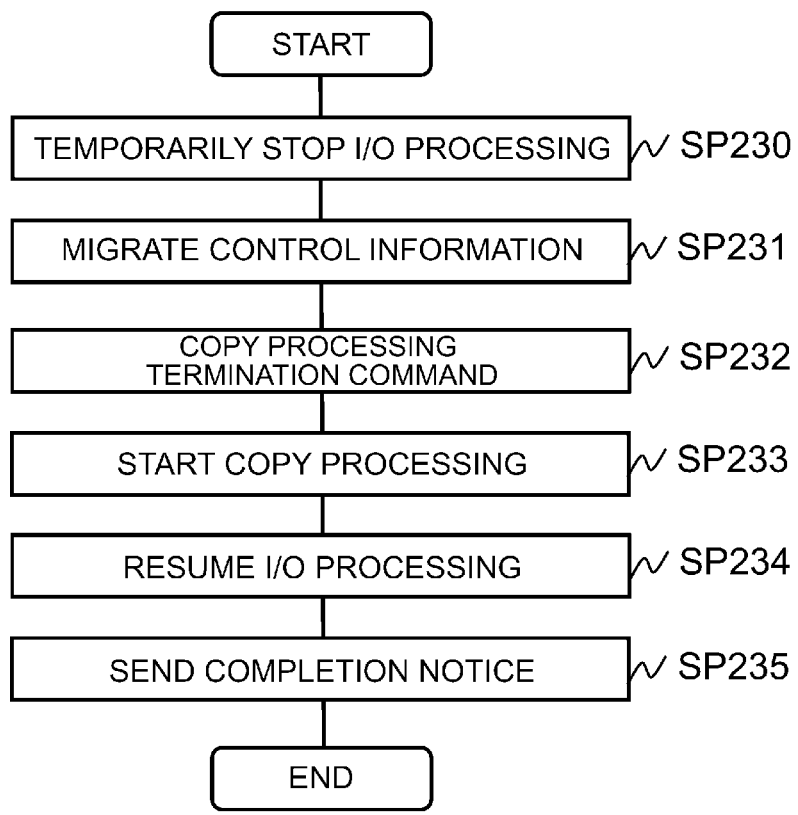
FIG. 19 is a flowchart showing a processing sequence for copy processing migration processing.

FIG. 19 shows a processing sequence for the processing executed by the migration destination storage apparatus 4B which received the copy processing migration command in step SP184 of the volume migration command processing.

Firstly, the migration destination storage apparatus 4B temporarily stops processing of an input/output request from the host computer 2 to the primary migration destination VOL 150B and the secondary migration destination VOL 151B (SP230).

As one method for temporarily stopping the input/output request processing, the migration destination storage apparatus 4B discards input/output requests from the host computer 2 to the primary migration destination VOL 150B and the secondary migration destination VOL 151B until it resumes the input/output request processing in step SP234. In this case, after resumption of the input/output request processing in step SP234, the migration destination storage apparatus 4B processes an input/output request(s) reissued by the alternate path program 131.

As another method for temporarily stopping the input/output request processing, the migration destination storage apparatus 4B stores input/output requests from the host computer 2 to the primary migration destination VOL 150B and the secondary migration destination VOL 151B in the memory 41B until it resumes the input/output request processing in step SP234. In this case, after resuming the input/output request processing in step SP234, the migration destination storage apparatus 4B processes the input/output request(s) stored in the memory 41B.

Next, the migration destination storage apparatus 4B migrates the control information for the copy processing between the primary migration source VOL 150A and the secondary migration source VOL 151A from the memory 41A for the migration source storage apparatus 4A to the memory 41B for the migration destination storage apparatus 4B (SP231).

Specifically speaking, the migration destination storage apparatus 4B firstly creates a new local copy management entry 110B and adds it to the local copy management table 67B. When doing so, the migration destination storage apparatus 4B registers the logical device number 81B of the primary migration destination VOL 150B and the secondary migration destination VOL 151B in the primary-VOL logical device number 111B and the secondary-VOL logical device number 112B of this local copy management entry 110B, respectively. The migration destination storage apparatus 4B then copies the pair status 113A and the difference management information 114A from the local copy management entry 110A corresponding to the copy processing between the primary migration source VOL 150A and the secondary migration source VOL 151A, to the pair status 113B and the difference management information 114B of the newly created local copy management entry 110B.

Next, the migration destination storage apparatus 4B gives a command to the migration source storage apparatus 4A to terminate the copy processing between the primary migration source VOL 150A and the secondary migration source VOL 151A (SP232). The migration source storage apparatus 4A terminates the copy processing the primary migration source VOL 150A and the secondary migration source VOL 151A in accordance with this command.

Specifically speaking, when a write request is issued to the primary migration source VOL 150A, the local copy program 61A terminates the local copy processing for copying write data from the primary migration source VOL 150A to the secondary migration source VOL 151A. In this case, the local copy program 61A may terminate the difference management of the primary migration source VOL 150A and the secondary migration source VOL 151A.

On the other hand, if the local copy program 61A continues the difference management and stores difference management information of data occurring between the primary migration source VOL 150A and the secondary migration source VOL 151A and a failure occurs in the migration destination storage apparatus 4B during the volume migration processing, the local copy program 61A can increase the speed of the processing for returning to the use of the storage apparatus 4A based on the stored difference management information.

Incidentally, even if the difference management is terminated, the local copy program 61A can reproduce the same state as the case where the difference management is continued, by calculating data difference between the primary migration source VOL 150A and the secondary migration source VOL 151A from the data of the primary migration source VOL 150A and the secondary migration source VOL 151A; however, the length of time it takes to return to the use of the storage apparatus 4A will increase by the length of time required for the calculation.

Next, the migration destination storage apparatus 4B starts the copy processing between the primary migration destination VOL 150B and the secondary migration destination VOL 151B (SP233).

Specifically speaking, when a write request is issued from the host computer 2 to the primary migration destination VOL 150B, the local copy program 61B starts the local copy processing for copying write data from the primary migration destination VOL 150B to the secondary migration destination VOL 151B and the difference management between the primary migration destination VOL 150B and the secondary migration destination VOL 151B. However, since the input/output request processing is temporarily stopped until step SP234, it is after step SP234 when the local copy program 61B actually starts copying the write data and updating the difference management information 114B.

Next, the migration destination storage apparatus 4B resumes the processing of input/output requests from the host computer 2 to the primary migration destination VOL 150B and the secondary migration destination VOL 151B (SP234). If input/output requests from the host computer 2 to the primary migration destination VOL 150B and the secondary migration destination VOL 151B are stored in the memory 41B, the migration destination storage apparatus 4B also starts the processing thereof.

Finally, the migration destination storage apparatus 4B sends completion notice to the volume migration command program 140 (SP235).

(1-2-2-7) Data Migration Processing

Figure 20:
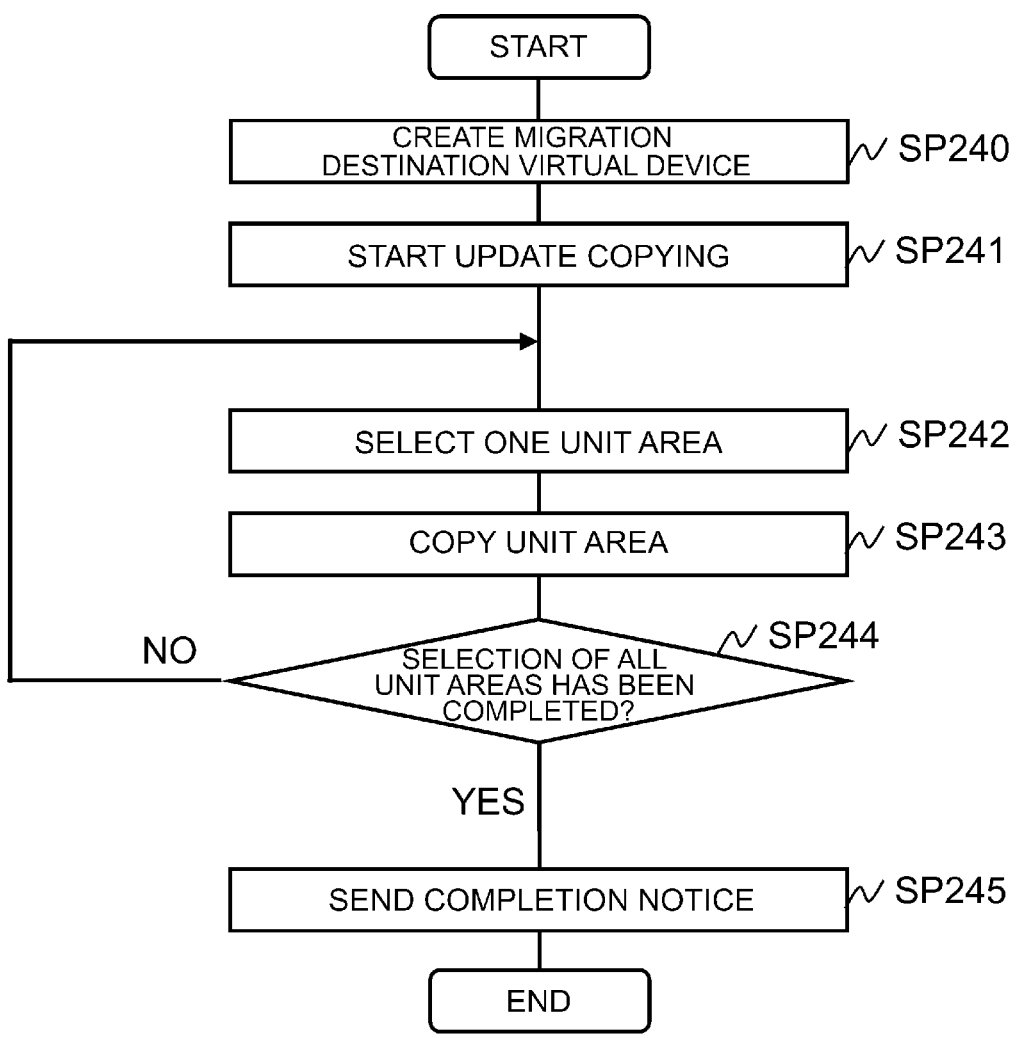
FIG. 20 is a flowchart showing a processing sequence for data migration processing.

FIG. 20 shows a processing sequence for the processing executed by the migration destination storage apparatus 4B which received the data migration command in step SP185 of the volume migration command processing. The processing for migrating data of the primary migration source VOL 150A will be explained below; however, the same processing will be also executed for the processing for migrating data of the secondary migration source VOL 151A.

Firstly, the migration destination storage apparatus 4B creates a virtual device 50B which is to be a migration destination of data of the primary migration source VOL 150A (SP240).

Specifically speaking, the storage tier management program 60B for the migration destination storage apparatus 4B adds a new virtual device management entry 90B to the virtual device management table 65B and registers the identification information about the storage device 30B as the lower storage tier identification information 92B of this virtual device management entry 90B.

Next, when a write request is issued to the primary migration destination VOL 150B, the migration destination storage apparatus 4B starts update copy processing for writing write data to the virtual device 50B corresponding to the primary migration destination VOL 150B and copying the write data to the virtual device 50B created in step SP240 (SP241). As a result of this update copying, it is possible to prevent data which has been migrated once from becoming old. This update copying continues until the completion of the volume migration processing.

Next, the migration destination storage apparatus 4B copies data stored in the virtual device (copy source virtual device) 50B corresponding to the primary migration destination VOL 150B to the virtual device (copy destination virtual device) 50B created in step SP240. As a result of this processing, the data stored in the primary migration source VOL 150A is copied via the virtual device 50B corresponding to the primary migration destination VOL 150B to the virtual device 50B created in step SP240.

Specifically speaking, the data migration program 62B for the migration destination storage apparatus 4B firstly selects one unit storage area in the virtual device 50B corresponding to the primary migration destination VOL 150B (SP242).

Next, the data migration program 62B copies data stored in that unit storage area to the virtual device 50B created in step SP230 (SP243).

Subsequently, the data migration program 62B judges whether selection of all unit storage areas in the virtual device 50B corresponding to the primary migration destination VOL 150B has been completed or not (SP244).

If the data migration program 62B obtains an affirmative result in this step, determining that the selection of all the unit storage areas has been completed, the data migration program 62B proceeds to step SP245. On the other hand, if the data migration program 62B obtains a negative judgment, determining that the selection of all the unit storage areas has not been completed, the data migration program 62B returns to step SP242 and then repeats the processing of step SP242 to step SP244 while switching from one unselected unit storage area to another to be selected in step SP242. Then, when the data migration program 62B eventually obtains the affirmative result in step SP244, it proceeds to step SP245.

After completing the processing for migrating data of both the primary migration source VOL 150A and the secondary migration source VOL 151A, the migration destination storage apparatus 4B sends completion notice to the volume migration command program 140 (SP245).

(1-2-2-8) Write-Cache-On Processing

Figure 21:
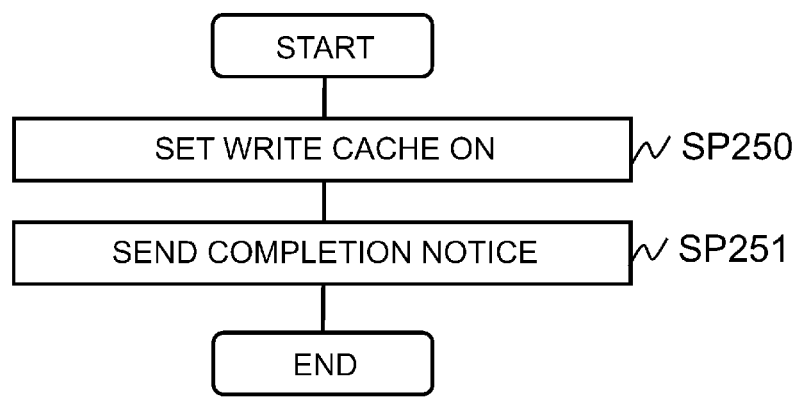
FIG. 21 is a flowchart showing a processing sequence for write-cache-on processing.

FIG. 21 shows a processing sequence for the processing executed by the migration destination storage apparatus 4B which received the write-cache-on command in step SP186 of the volume migration command processing. The processing for setting on the write cache mode of the primary migration destination VOL 150B will be explained below; however, the same processing will be also executed for the processing for setting on the write cache mode of the secondary migration destination VOL 151B.

Firstly, the migration destination storage apparatus 4B sets on the write cache mode of the primary migration destination VOL 150B (SP250).

Specifically, the storage tier management program 60B for the migration destination storage apparatus 4B registers ON for the write cache mode 85B of the logical device management entry 80B corresponding to the primary migration destination VOL 150B.

After completing the processing for setting on the write cache mode of both the primary migration destination VOL 150B and the secondary migration destination VOL 151B, the migration destination storage apparatus 4B sends completion notice to the volume migration command program 140 (SP251).

(1-2-2-9) Migration Source Volume Virtualization Termination Processing

Figure 22:
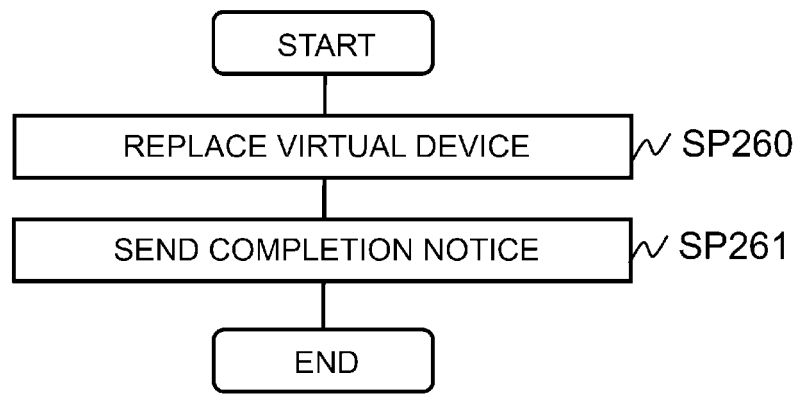
FIG. 22 is a flowchart showing a processing sequence for migration source volume virtualization termination processing.

FIG. 22 shows a processing sequence for the processing executed by the migration destination storage apparatus 4B which received the migration source volume virtualization termination command in step SP187 of the volume migration command processing.

Firstly, the migration destination storage apparatus 4B switches from the virtual devices corresponding to the primary migration destination VOL 150B and the secondary migration destination VOL 151B to the virtual devices 50B created in step SP240, respectively.

Specifically speaking, the storage tier management program 60B for the migration destination storage apparatus 4B registers the virtual device number 82B of the virtual devices (copy destination virtual devices) 50B created in step SP240 as the virtual device number 82B of the logical device management entries 80B corresponding to the primary migration destination VOL 150B and the secondary migration destination VOL 151B respectively. As a result of this processing, the primary migration destination VOL 150B and the secondary migration destination VOL 151B become the logical devices 51B having data in the migration destination storage apparatus 4B and are no longer the logical devices 51B which virtualize the primary migration source VOL 150A and the secondary migration source VOL 150B.

Next, the migration destination storage apparatus 4B sends completion notice to the volume migration command program 140 (SP261).

(1-2-3) Input/Output Processing in Migration Destination Storage Apparatus

Next, read processing and write processing in the migration destination storage apparatus 4B will be explained below.

(1-2-3-1) Read Processing

Figure 23:
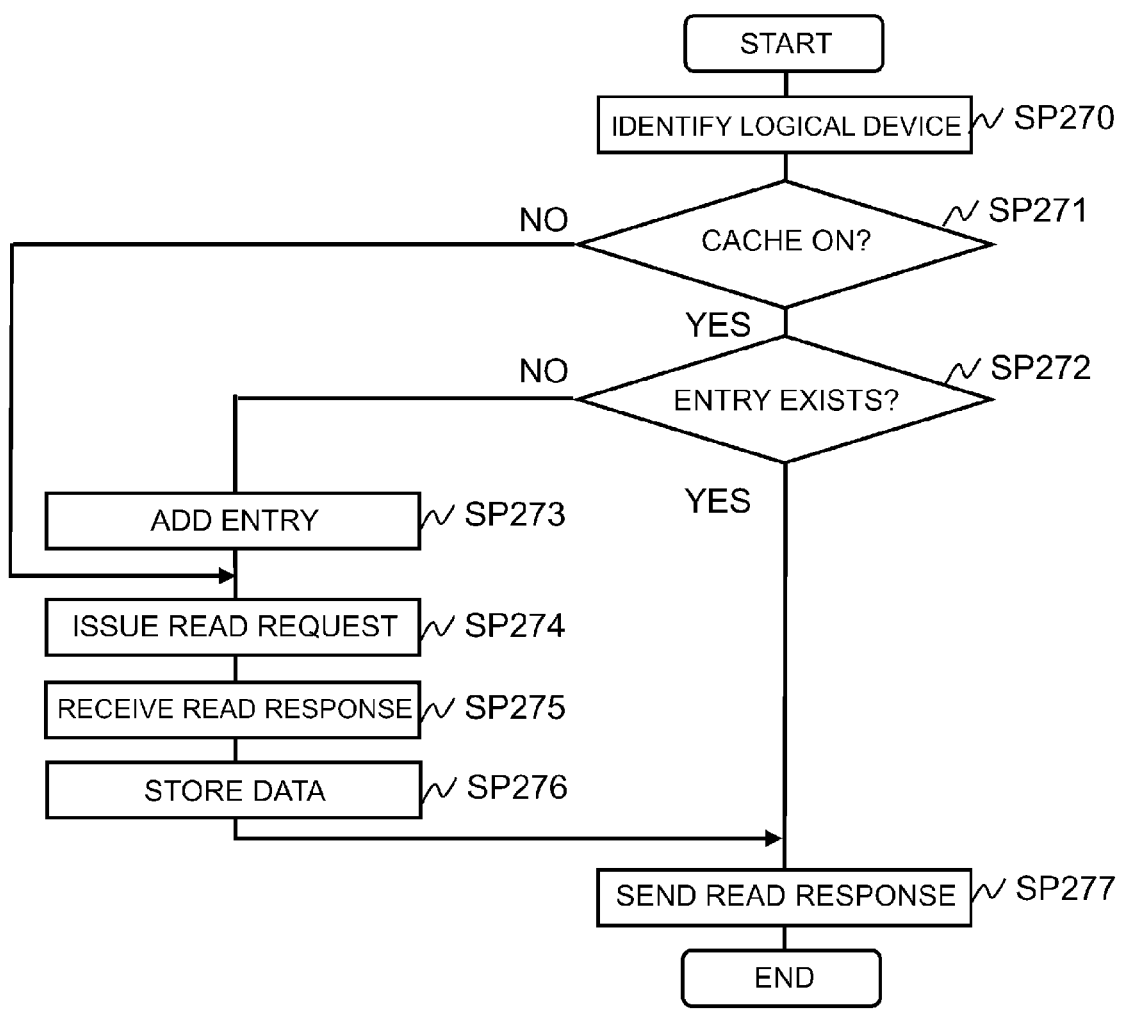
FIG. 23 is a flowchart showing a processing sequence for reading processing by the migration destination storage apparatus.

FIG. 23 shows a processing sequence for read processing executed by the migration destination storage apparatus 4B when receiving a read request from the host computer 2.

After receiving the read request from the host computer 2, the migration destination storage apparatus 4B starts this read processing and firstly identifies the logical device 51B from which to read data (SP270).

Specifically speaking, the migration destination storage apparatus 4B firstly extracts the LUN from the read request and identifies the logical unit management entry 70B corresponding to the extracted LUN by referring to the logical unit management table 63B. Then, the migration destination storage apparatus 4B refers to the logical device management table 64B and thereby identifies the logical device management entry 80B corresponding to the logical device number 73B of the identified logical unit management entry 70B.

Next, the migration destination storage apparatus 4B judges whether or not the read cache mode is set on, by referring to the read cache mode 84B of the logical device management entry 80B identified in step SP270 (SP271).

If a negative result is obtained in this judgment, determining that the read cache mode is OFF, the migration destination storage apparatus 4B proceeds to step SP274; and if an affirmative result is obtained, determining that the read cache mode is ON, the migration destination storage apparatus 4B proceeds to step SP272.

Accordingly, if the migration destination storage apparatus 4B receives a read request from the host computer 2 to the primary migration destination VOL 150B or the secondary migration destination VOL 151B after the execution of step SP200 and before execution of step SP220 of the aforementioned volume migration processing explained with reference to FIG. 14 to FIG. 22, it proceeds to processing of step SP274; otherwise, it proceeds to processing of step SP272.

If the read cache mode is ON as the judgment result of step SP271 and the processing proceeds to step SP272, the migration destination storage apparatus 4B refers to the cache management table 66B and judges whether a cache management entry 100B corresponding to the read data exists or not (SP272).

An affirmative result, determining that the cache management entry 100B corresponding to the read data exists, means that the read data is stored in the cache memory 43B. Accordingly, the migration destination storage apparatus 4B then reads that data from the cache memory 43B and sends the read data to the host computer 2 which is a sender of the read request (SP277). Subsequently, the migration destination storage apparatus 4B terminates this read processing.

On the other hand, a negative result for the judgment in step SP272, determining that no cache management entry 100B corresponding to the read data exists, means that the read data is not stored in the cache memory 42B. Accordingly, the migration destination storage apparatus 4B then adds a cache management entry 100B corresponding to that data to the cache management table 66B (SP273).

When this happens, the migration destination storage apparatus 4B registers an address of an unused area in the cache memory 43B as the cache address 101B in the cache management table 66B and also registers data identification information included in the read request as the data identification information 102B in the cache management table 66B. Subsequently, the migration destination storage apparatus 4B proceeds to step SP274.

Having proceeded to step SP274, the migration destination storage apparatus 4B refers to the virtual device management table 65B and identifies the corresponding virtual device management entry 90B based on the virtual device number 82B of the logical device management entry 80B identified in step SP270. Subsequently, the migration destination storage apparatus 4B identifies a lower storage tier based on the lower storage tier identification information 92B registered in that virtual device management entry 90B and transfers the read request to the identified lower storage tier (SP274).

Furthermore, after receiving a response (read data) sent from the lower storage tier in response to the read request (SP275), the migration destination storage apparatus 4B stores the received read data in the cache memory 43B (SP276). Incidentally, in step SP276, the migration destination storage apparatus 4B does not add the cache management entry 100B corresponding to this data to the cache management table 66B. Therefore, if step SP273 is not executed, the cache memory 43B is used merely as a place to temporarily store the data.

Next, the migration destination storage apparatus 4B reads the data stored in step SP276 from the cache memory 43B and sends the read data to the host computer 2 which is a sender of the read request (SP277). Subsequently, the migration destination storage apparatus 4B terminates this read processing.

(1-2-3-2) Write Processing

Figure 24:
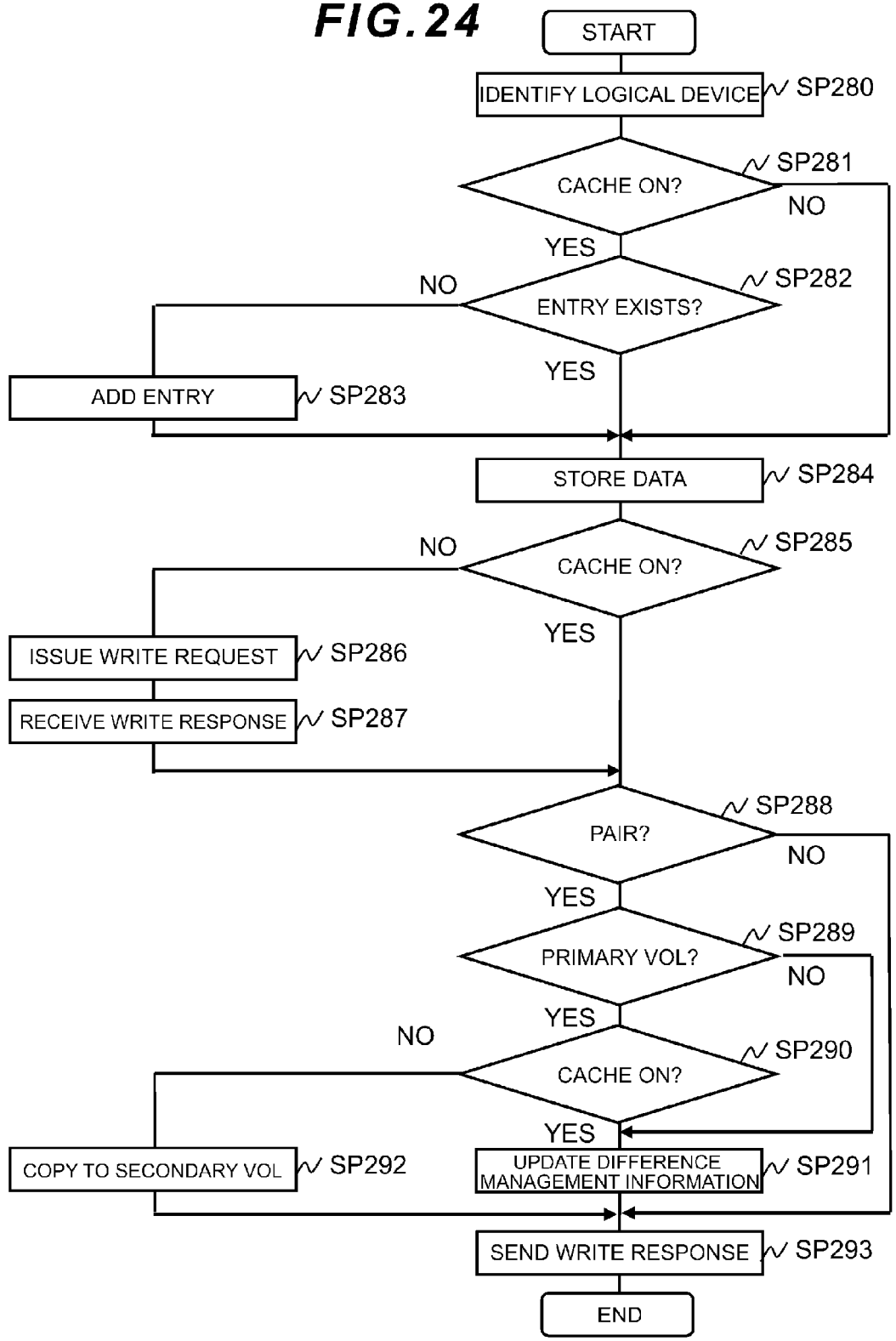
FIG. 24 is a flowchart showing a processing sequence for writing processing by the migration destination storage apparatus.

FIG. 24 shows a processing sequence for write processing executed by the migration destination storage apparatus 4B when receiving a write request from the host computer 2.

After receiving the write request from the host computer 2, the migration destination storage apparatus 4B starts this write processing and firstly identifies a logical device 51B to which to write data (SP280).

Specifically speaking, the migration destination storage apparatus 4B firstly extracts the LUN from the write request and identifies the logical unit management entry 70B corresponding to the extracted LUN by referring to the logical unit management table 63B. Then, the migration destination storage apparatus 4B refers to the logical device management table 64B and thereby identifies the logical device management entry 80B corresponding to the logical device number 73B of the identified logical unit management entry 70B.

Next, the migration destination storage apparatus 4B judges whether or not the write cache mode is set on, by referring to the write cache mode 85B of the logical device management entry 80B identified in step SP280 (SP281).

If a negative result is obtained, determining that the write cache mode is OFF, the migration destination storage apparatus 4B proceeds to step SP284; and if an affirmative result is obtained, determining that the write cache mode is ON, the migration destination storage apparatus 4B proceeds to step SP282.

Accordingly, if the migration destination storage apparatus 4B receives a write request to the primary migration destination VOL 150B or the secondary migration destination VOL 151B after the execution of step SP201 and before execution of step SP250 of the aforementioned volume migration processing explained with reference to FIG. 14 to FIG. 22, it proceeds to processing of step SP284; otherwise, it proceeds to processing of step SP282.

If the write cache mode is ON as the judgment result of step SP281 and the processing proceeds to step SP282, the migration destination storage apparatus 4B refers to the cache management table 66B and judges whether a cache management entry 100B corresponding to the write data exists or not (SP282).

A negative result for this judgment, determining that no cache management entry 100B corresponding to the write data exists, means that the write data before being stored in the storage device 30B (or the external storage apparatus if the external connection function is used) is not stored in the cache memory 42B. Accordingly, the migration destination storage apparatus 4B then adds a cache management entry 100B corresponding to that write data to the cache management table 66B (SP283).

When this happens, the migration destination storage apparatus 4B registers an address of an unused area in the cache memory 43B as the cache address 101B in the cache management table 66B and also registers data identification information included in the write request as the data identification information 102B in the cache management table 66B. Subsequently, the migration destination storage apparatus 4B proceeds to step SP284.

Having proceeded to step SP284, the migration destination storage apparatus 4B stores the write data in the cache memory 43B (SP284). Incidentally, in step SP284, the migration destination storage apparatus 4B does not add the cache management entry 100B corresponding to this data to the cache management table 66B. Therefore, if the negative result is obtained in step SP281, determining that the write cache mode is OFF, the cache memory 43B is used merely as a place to temporarily store the data.

Subsequently, the migration destination storage apparatus 4B judges again whether or not the write cache mode is set on, by referring to the write cache mode 85B of the logical device management entry 80B identified in step SP280 (SP285).

If an affirmative result is obtained in this judgment, determining that the write cache mode is ON, the migration destination storage apparatus 4B proceeds to step SP288.

On the other hand, if a negative result is obtained in this judgment, determining that the write cache mode is OFF, the migration destination storage apparatus 4B proceeds to step SP286, refers to the virtual device management table 65B and identifies the corresponding virtual device management entry 90B based on the virtual device number 82B of the logical device management entry 80B identified in step SP280. Subsequently, the migration destination storage apparatus 4B identifies a lower storage tier based on the lower storage tier identification information 92B registered in that virtual device management entry 90B and transfers the write request to the identified lower storage tier (SP286).

Furthermore, after receiving a response (write completion notice) sent from the lower storage tier in response to the write request (SP287), the migration destination storage apparatus 4B proceeds to step SP288. If a negative result is thus obtained in the judgment of step SP285, determining that the write cache mode is OFF, the migration destination storage apparatus 4B executes the write-through processing.

Having proceeded to step SP288, the migration destination storage apparatus 4B judges whether or not the local copy function is applied to the logical device 51B identified in step SP280 and the copy processing status is PAIR.

Specifically speaking, the migration destination storage apparatus 4B firstly refers to the local copy management table 67B and identifies a local copy management entry 110B, which has the logical device number 81A corresponding to the logical device 51B identified in step SP280 as the primary-VOL logical device number 11B or the secondary-VOL logical device number 112B. Then, if such a local copy management entry 110B exists and the pair status 113B of that local copy management entry 110B is PAIR, that is, if an affirmative result is obtained in the judgment of step SP288, determining that the copy processing status is PAIR, the migration destination storage apparatus 4B proceeds to step SP289. Otherwise, the migration destination storage apparatus 4B recognizes that a negative result is obtained in the judgment of step SP 288, determining that the copy processing status is not PAIR; and then proceeds to step SP293.

Having proceeded to step SP289, the migration destination storage apparatus 4B judges whether the logical device 51B identified in step SP280 is a primary VOL or not.

Specifically speaking, the migration destination storage apparatus 4B refers to the primary-VOL logical device number 111B of the local copy management entry 110B identified in step SP288; and if that primary-VOL logical device number 111B matches the logical device number 81B corresponding to the logical device 51B identified in step SP280, the migration destination storage apparatus 4B recognizes that an affirmative result is obtained, determining that the logical device 51B identified in step SP280 is a primary VOL; and then proceeds to step SP290. Otherwise, the migration destination storage apparatus 4B recognizes that a negative result is obtained, determining that the logical device 51B identified in step SP280 is not a primary VOL, it proceeds to step SP291.

Having proceeded to step SP290, the migration destination storage apparatus 4B refers to the write cache mode 85 of the logical device 80B identified in step SP280 and judges whether the write cache mode is set on or not (SP290).

If an affirmative result is obtained in this judgment, determining that the write cache mode is ON, the migration destination storage apparatus 4B proceeds to step SP291; and if a negative result is obtained in this judgment, determining that the write cache mode is OFF, the migration destination storage apparatus 4B proceeds to step SP292.

However, this is a case where the local copy program 61B performs copying asynchronously with the write request. If the local copy program 61B performs copying synchronously with the write request, step SP290 is unnecessary; and if a negative result is obtained in the judgment of step SP290, determining that the write cache mode is OFF, the migration destination storage apparatus 4B proceeds to step SP292.

Having proceeded to step SP291, the migration destination storage apparatus 4B records, in the difference management information 114B of the local copy management entry 110B identified in step SP288, that the occurrence of difference in a storage area corresponding to the write request. The migration destination storage apparatus 4B then proceeds to step SP293.

On the other hand, having proceeded to step SP292, the migration destination storage apparatus 4B copies the write data to the logical device 81B corresponding to the secondary-VOL logical device number 112B of the local copy management entry 110B identified in step SP288. As a result of this copying, the latest data exists in the migration source storage apparatus 4A also with respect to the secondary migration source VOL 151A in the PAIR state. Then, the migration destination storage apparatus 4B proceeds to step SP293.

Having proceeded to step SP293, the migration destination storage apparatus 4B sends a write response, stating that the writing processing has been completed, to the host computer 2 which is a sender of the write request (SP293); and then terminates this write processing.

Regarding this embodiment, if the input/output request receiver is changed by the host computer 2 from the migration source storage apparatus 4A to the migration destination storage apparatus 4B and a write request is then received as an input/output request to the primary migration destination VOL 150 or the secondary migration destination VOL 151B, on condition that the processing for writing write data to the primary migration destination VOL 150B and the secondary migration destination VOL 151B as well as the primary migration source VOL 150A and the secondary migration source VOL 151A until the termination of the migration processing for migrating the migration target volumes (the primary migration source VOL 150A and the secondary migration source VOL 151A), the control unit 31B executes the control information migration processing for migrating the copy processing control information stored by the control unit 31A to the control unit 31B and the data migration processing for migrating the data stored in the primary migration source VOL 150A and the secondary migration source VOL 151A to the primary migration destination VOL 150 and the secondary migration destination VOL 151B, respectively.

Specifically speaking, since the write-through processing is executed on the primary migration source VOL 150A and the secondary migration source VOL 151A until the termination of the migration processing for migrating the migration target volumes (the primary migration source VOL 150A and the secondary migration source VOL 151A), the latest data can be retained in the primary migration source VOL 150A and the secondary migration source VOL 151A. Therefore, if a failure occurs in the migration destination storage apparatus 4B during the volume migration processing, the latest data retained in the primary migration source VOL 150A and the secondary migration source VOL 151A can be used for restoration from the failure.

According to this embodiment, a path for migrating volumes between the host computer and the storage apparatuses can be formed without depending on the configuration of the host computer and the network device and a plurality of volumes, which are local copy targets, can be migrated from the migration source storage apparatus to the migration destination storage apparatus while maintaining the data in the latest state.

Second Embodiment

A computer system according to a second embodiment is configured in the same manner as the computer system according to the first embodiment, except that the processing content of part of data migration processing is different.

According to this embodiment, migration source volumes are a plurality of logical devices 51A in the migration source storage apparatus 4A; and copy processing (local copy processing) is executed between these logical devices 51 by the local copy program 61A. These logical devices 51A may constitute a cascade (one logical device 51A may be a copy source of certain copy processing and a copy destination of another copy processing at the same time). Alternatively, these logical devices 51A may be configured as multi-targets (one logical device 51A may be a copy source of a plurality of copy processing). These logical devices 51A will be hereinafter referred to as migration source VOLs 300A.

Furthermore, in this embodiment, migration destination volumes are a plurality of logical devices 51B in the migration destination storage apparatus 4B. These logical devices 51A will be hereinafter referred to as the migration destination VOLs 300B.

Figure 25:
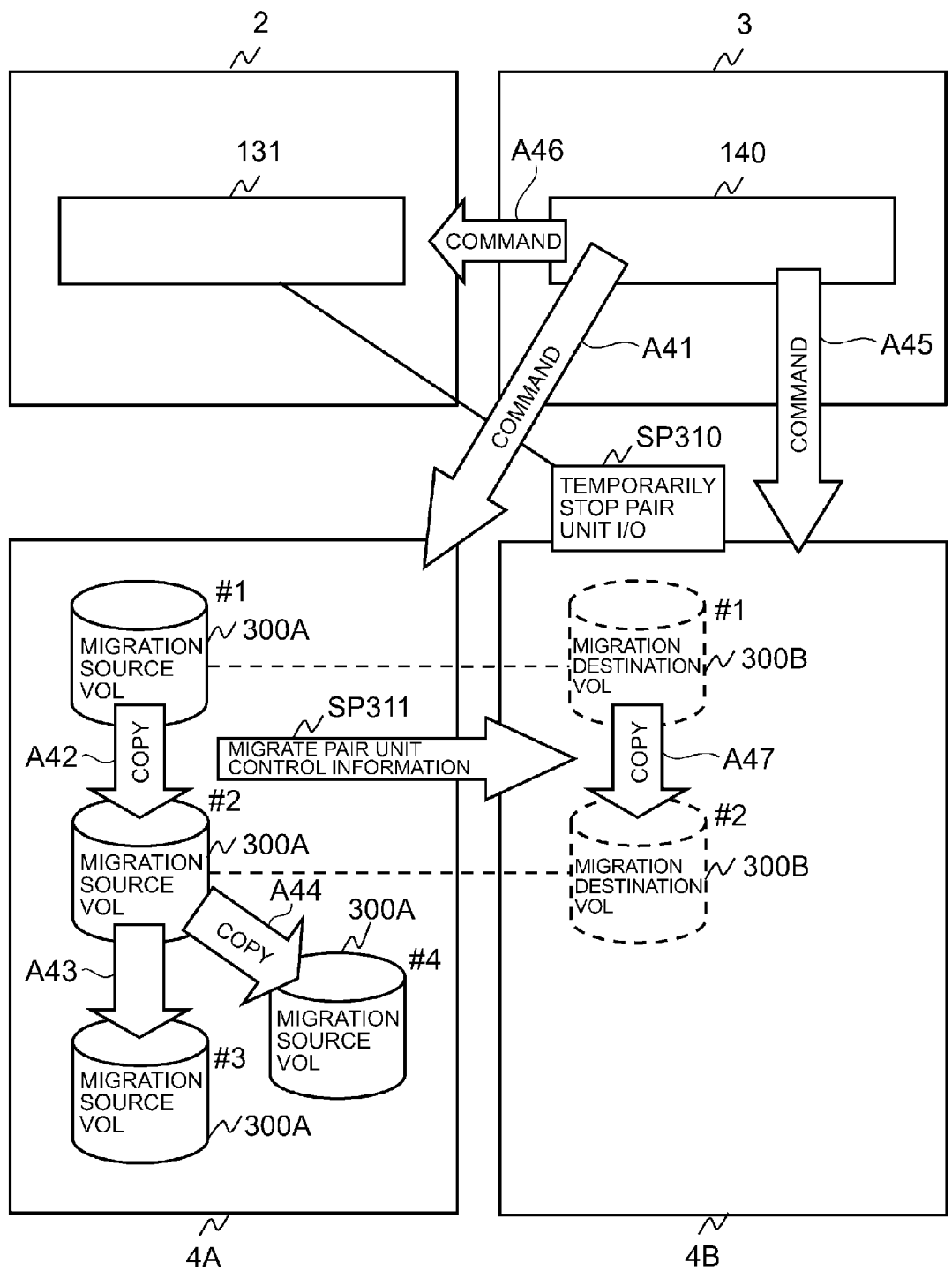
FIG. 25 is a schematic diagram conceptually showing volume migration processing according to a second embodiment.

FIG. 25 conceptually shows volume migration processing according to this embodiment.

Referring to FIG. 25, the main characteristics of this embodiment are: input/output request processing is temporarily stopped on a pair basis (SP310); and copy processing control information is migrated on a pair basis (SP311). As a result, is possible to reduce the length of time to stop input to, and output from, each volume as compared to a case where the copy processing control information for all the pairs is migrated at once.

Figure 26:
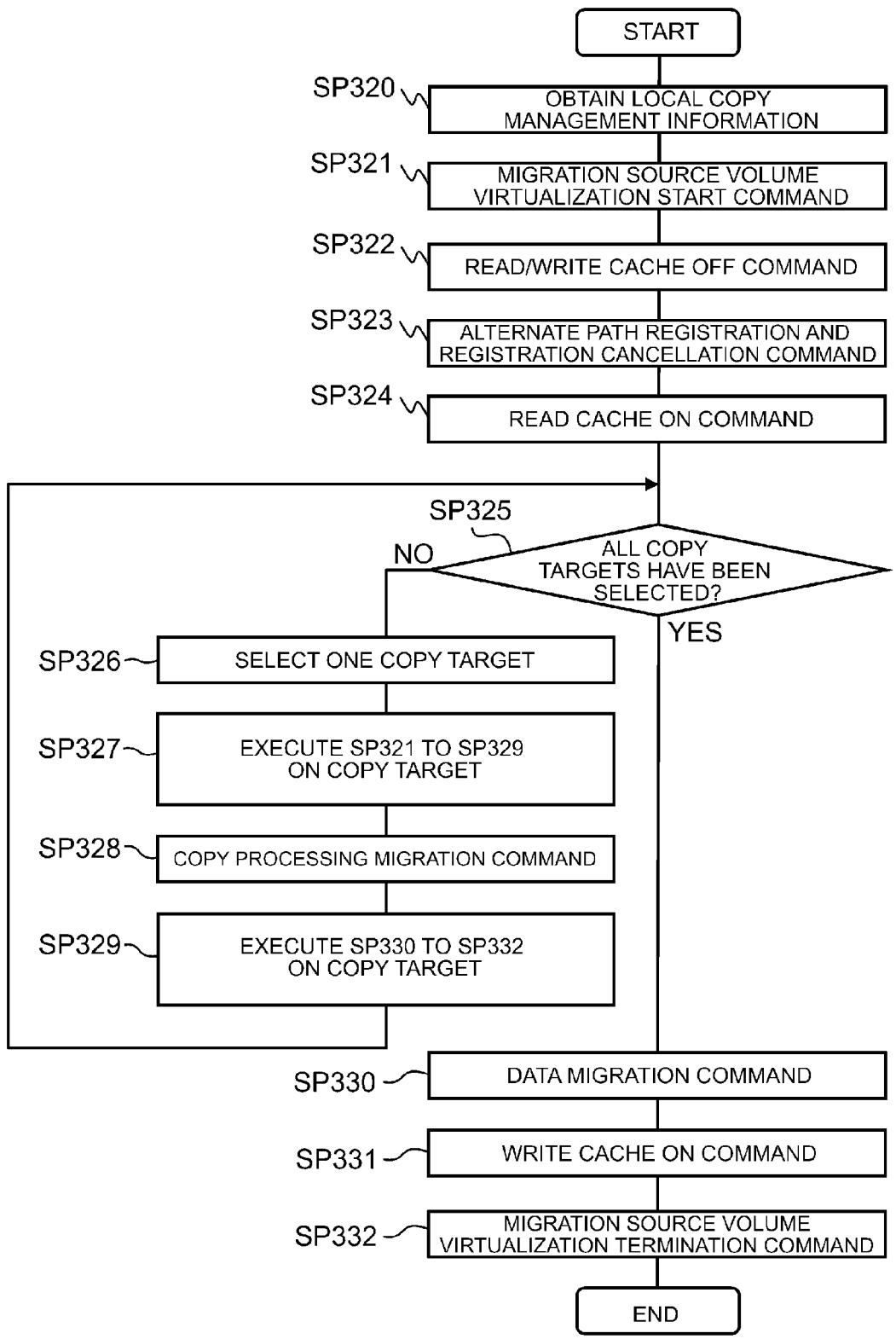
FIG. 26 is a flowchart showing a processing sequence for volume migration command processing according to the second embodiment.

FIG. 26 shows a processing sequence for volume migration command processing executed by the volume migration command program 140 in this embodiment.

Referring to FIG. 26, after receiving a command to migrate one migration source VOL 300A from the system administrator via the input device 24, the volume migration command program 140 for the management computer 3 starts the following processing.

Firstly, the volume migration command program 140 obtains the local copy management information from the migration source storage apparatus 4A (SP320).

Specifically speaking, the volume migration command program 140 gives a command (A41) to send the local copy management information to the migration source storage apparatus 4A. In response to this, the migration source storage apparatus 4A sends the content of the local copy management table 67B, for example, the content of the local copy processing (A42, A43, A44) between the migration source VOLs 300A, to the volume migration command program 140.

Next, the volume migration command program 140 gives a command (A45) to the migration destination storage apparatus 4B to start virtualization of the migration source VOL 300A regarding which it received the migration command from the system administrator (SP321). Since processing executed by the migration destination storage apparatus 4B when receiving this command (A45) is the same as step SP190 to step SP192, its explanation has been omitted.

Next, the volume migration command program 140 gives a command (A45) to the migration destination storage apparatus 4B to set off the read cache mode and the write cache mode of the migration destination VOL 300B considered as the migration source VOL 300A which is virtualized and regarding which the system administrator issued the migration command (SP322). Since processing executed by the migration destination storage apparatus 4B when receiving this command (A45) is the same as step SP200 to step SP202, its explanation has been omitted.

Next, the volume migration command program 140 gives a command (A46) to the host computer 2 to register a path to the migration destination storage apparatus 4B as an alternate path to a logical volume corresponding to the migration source VOL 300A, regarding which the system administrator issued the migration command, and cancel the registration of a path to the migration source storage apparatus 4A (SP323). Since processing executed by the host computer 2 when receiving this command (A46) is the same as step SP210 to SP213, its explanation has been omitted.

Next, the volume migration command program 140 gives a command (A45) to the migration destination storage apparatus 4B to set on the read cache mode of the migration destination VOL 300B considered as the migration source VOL 300A which is virtualized and regarding which the system administrator issued the migration command (SP324). Since processing executed by the migration destination storage apparatus 4B when receiving this command (A45) is the same as step SP220 to SP221, its explanation has been omitted.

Subsequently, the volume migration command program 140 refers to the local copy management information obtained in step SP320 and judges whether all the migration source VOLs 300A that are copy targets of the migration source VOL 300A, regarding which the system administrator issued the migration command, have been selected or not (SP325). If a negative result is obtained in this judgment, determining that all the migration source VOLs 300A which are copy targets have not been selected, the volume migration command program 140 proceeds to step SP326; and if an affirmative result is obtained, determining that all the migration source VOLs 300A which are copy targets have been selected, the volume migration command program 140 proceeds to step SP326.

If the volume migration command program 140 proceeds to step SP326, it refers to the local copy management information obtained in step SP320 and selects one migration source VOL 300A which is a copy target of the migration source VOL 300A regarding which the system administrator issued the migration command (SP326).

Next, the volume migration command program 140 executes step SP321 to step SP329 on the migration source VOL 300A selected in step SP326 (that is, the volume migration command program 140 executes processing on the migration source VOL 300A selected in step SP326 instead of executing the processing on the migration source VOL 300A regarding which the system administrator issued the migration command) (SP327).

Subsequently, the volume migration command program 140 gives a command (A45) to the migration destination storage apparatus 4B to migrate the control information for the copy processing between the migration source VOL 300A, regarding which the system administrator issued the migration command, and the migration source VOL 300A selected in step SP326 from the migration source storage apparatus 4A to the migration destination storage apparatus 4B (SP328). Since processing executed by the migration destination storage apparatus 4B when receiving this command (A45) is the same as SP230 to SP235, its explanation has been omitted.

Incidentally, in this case, the control information for the copy processing between the migration source VOL 300A regarding which the system administrator issued the migration command and the migration source VOL 300A selected in step SP326, for example, control information for the local copy processing (A42) between the migration source VOL 300A #1 and the migration source VOL 300A #2, control information for the local copy processing (A43) between the migration source VOL 300A #2 and the migration source VOL 300A #3, and control information for the local copy processing (A44) between the migration source VOL 300A #2 and the migration source VOL 300A #4, is migrated on a pair basis.

If a write request is issued to the migration destination VOL 300B #1, copy processing (A47) for copying write data from the migration destination VOL 300B #1 to the migration destination VOL 300B #2 is started. Next, the volume migration command program 140 executes step SP330 to step SP332 on the migration source VOL 300A selected in step SP326 (that is, the volume migration command program 140 executes processing on the migration source VOL 300A selected in step SP326 instead of executing the processing on the migration source VOL 300A regarding which the system administrator issued the migration command) (SP329).

Next, the volume migration command program 140 gives a command (A45) to the migration destination storage apparatus 4B to migrate data of the migration source VOL 300A, regarding which the system administrator issued the migration command, to the migration destination VOL 300B (SP330). Since processing executed by the migration destination storage apparatus 4B when receiving this command (A45) is the same as step SP240 to step SP245, its explanation has been omitted.

Subsequently, the volume migration command program 140 gives a command (A45) to the migration destination storage apparatus 4B to set on the write cache mode of the migration destination VOL 300B considered as the migration source VOL 300A which is virtualized and regarding which the system administrator issued the migration command (SP331). Since processing executed by the migration destination storage apparatus 4B when receiving this command (A45) is the same as step SP250 to step SP251, its explanation has been omitted.

Finally, the volume migration command program 140 gives a command (A45) to the migration destination storage apparatus 4B to terminate virtualization of the migration source VOL 300A regarding which the system administrator issued the migration command (SP332); and then terminates the processing in this routine. Since processing executed by the migration destination storage apparatus 4B when receiving the virtualization termination command (A45) is the same as step SP260 to step SP261, its explanation has been omitted.

In this embodiment, the control unit 31A selects two or more pairs, each of which is constituted from the copy-source migration source VOL 300A and the copy-destination migration source VOL 300A, from among a plurality of migration source VOLs 300A and controls the copy processing of the selected two or more pairs; and stores the control information for the copy processing of the two or more pairs. The control unit 31B executes, as the migration processing for migrating the migration target volumes, the control information migration processing for migrating the control processing control information stored by the control unit 31A to the control unit 31A on a pair basis, and the data migration processing for migrating data stored in each copy-source migration source VOL 300A to each migration destination VOL 300B on a pair basis.

Since the control information for the copy processing of each pair is migrated pair by pair according to this embodiment, the length of time to stop the input/output request processing can be reduced to be shorter than a case where the control information for the copy processing of all the pairs is migrated at once.

Third Embodiment

Figure 27:
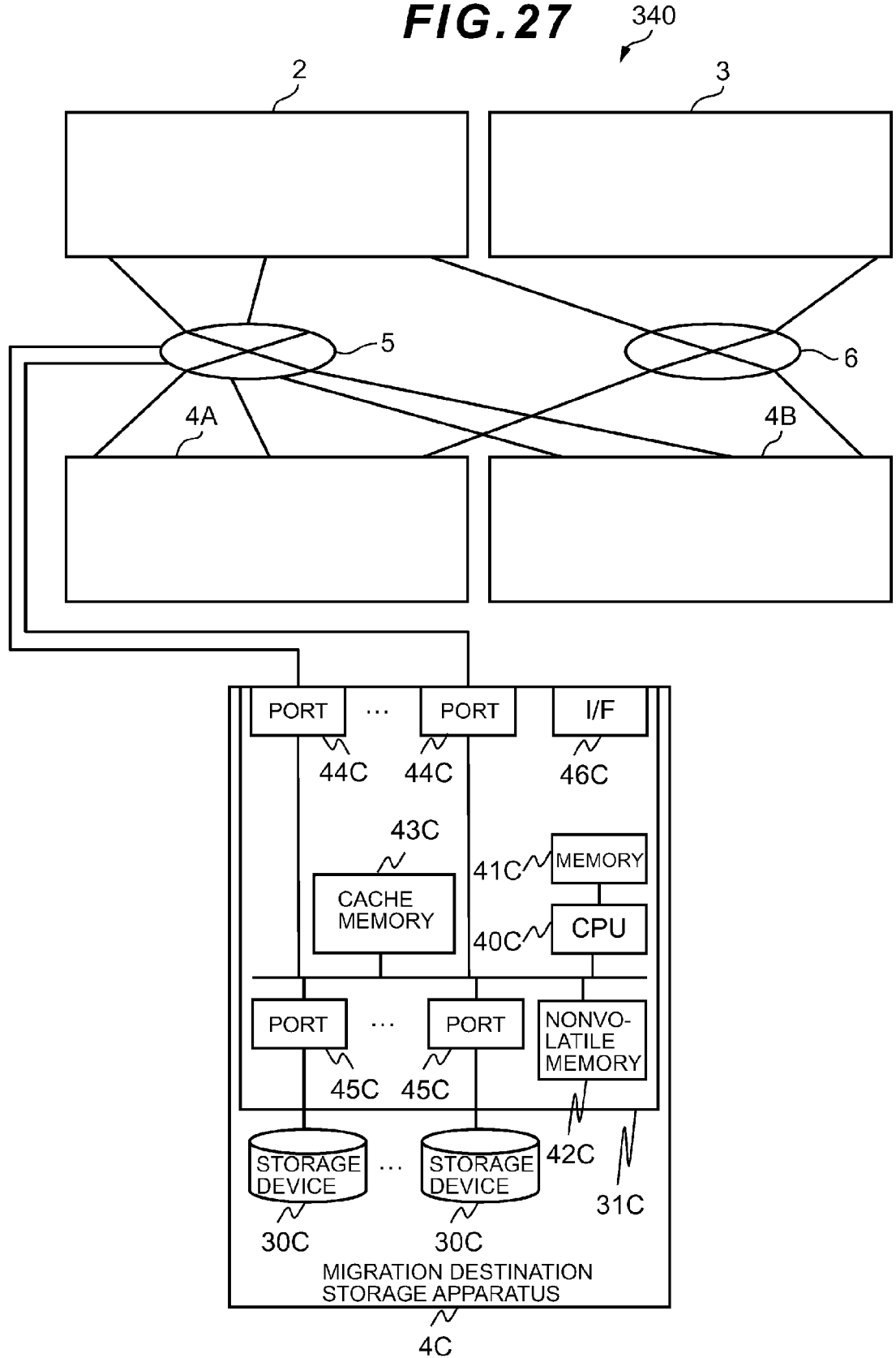
FIG. 27 is a block diagram showing the overall configuration of a computer system according to a third embodiment.

FIG. 27 is a block diagram of the overall configuration of a computer system according to a third embodiment of the present invention. Referring to FIG. 27, a computer system 340 is configured in the same manner as the computer system 1 according to the first embodiment, except that the computer system 340 has a third storage apparatus 4C, the migration source storage apparatus 4A and the migration destination storage apparatus 4B have, instead of the local copy function, a remote copy function copying data stored in logical devices 51A, 51B to logical devices 51A, 51B in a different storage apparatus, and the processing content of the volume migration command program 140 for the management computer 3 is different.

Since the configuration of the storage apparatus 4C is the same as that of the storage apparatuses 4A, 4B, its explanation has been omitted. Incidentally, the storage apparatus 4C constitutes a migration destination storage apparatus for the migration source storage apparatus 4A. Furthermore, if the storage apparatus 4B is the migration source storage apparatus, the storage apparatus 4C constitutes a migration destination storage apparatus for the migration source storage apparatus 4B. Incidentally, in this embodiment, the storage apparatus 4C is a copy destination of the remote copy function. This will be hereinafter referred to as the secondary storage apparatus 4C.

Figure 28:
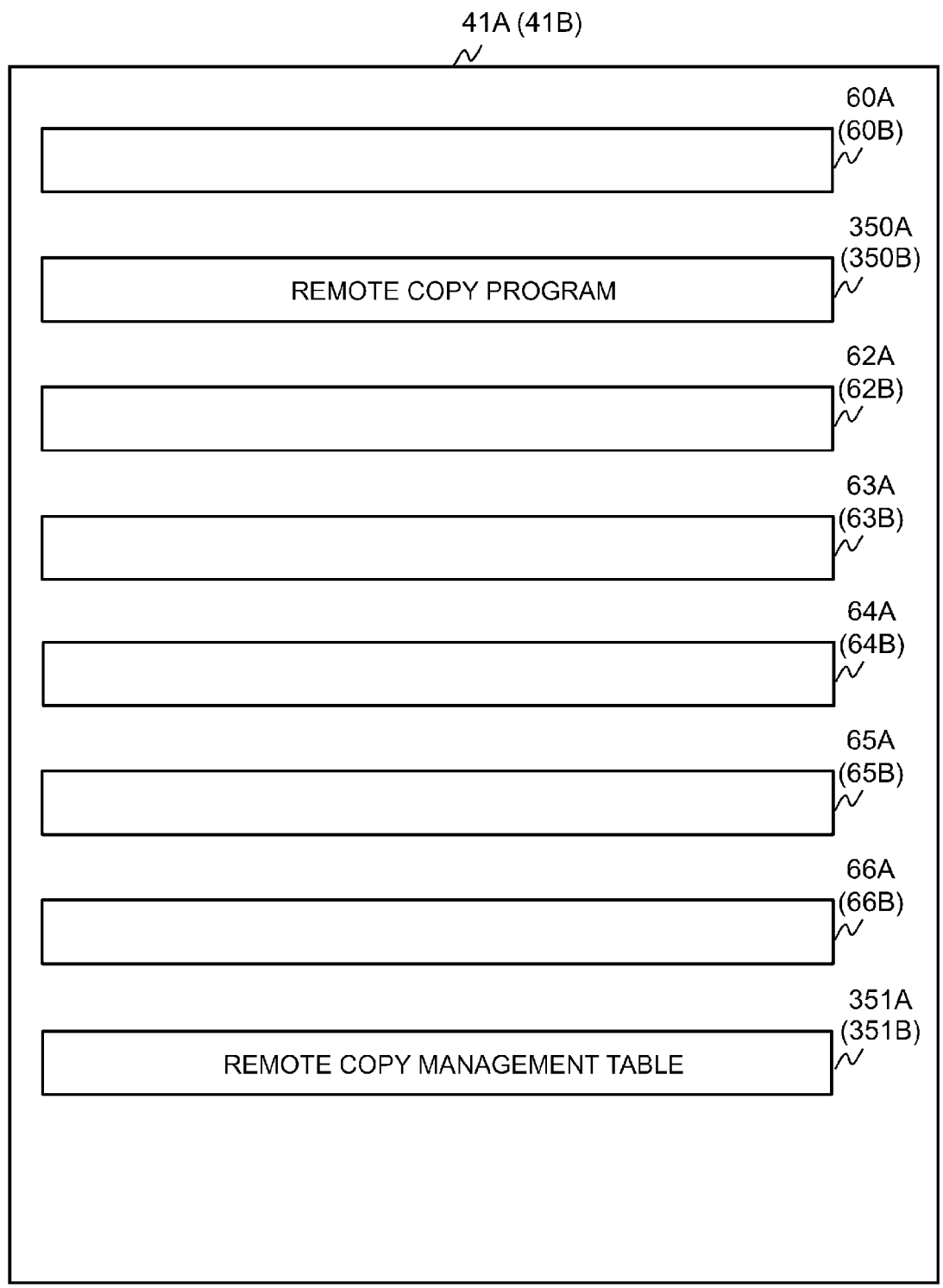
FIG. 28 is a data structure diagram of a memory for a migration source storage apparatus and a memory for a migration destination storage apparatus according to the third embodiment.

FIG. 28 shows a data structure of the memory 41A for the migration source storage apparatus 4A and the memory 41B for the migration destination storage apparatus 4B according to this embodiment. As an explanation in relation to the first embodiment, the difference between the data structure of the memory 41A, 41B according to this embodiment and the data structure of the memory 41A, 41B according to the first embodiment is that a remote copy program 350A, 350B and a remote copy management table 351A, 351B are stored instead of the local copy program 61A, 61B and the local copy management table 67A, 67B.

The remote copy program 350A, 350B is a program for implementing the remote copy function in the migration source storage apparatus 4A or the migration destination storage apparatus 4B; and executes processing for copying data stored in the logical device 51A, 51B to a logical device (copy-destination logical device) in a different storage apparatus.

Figure 29:
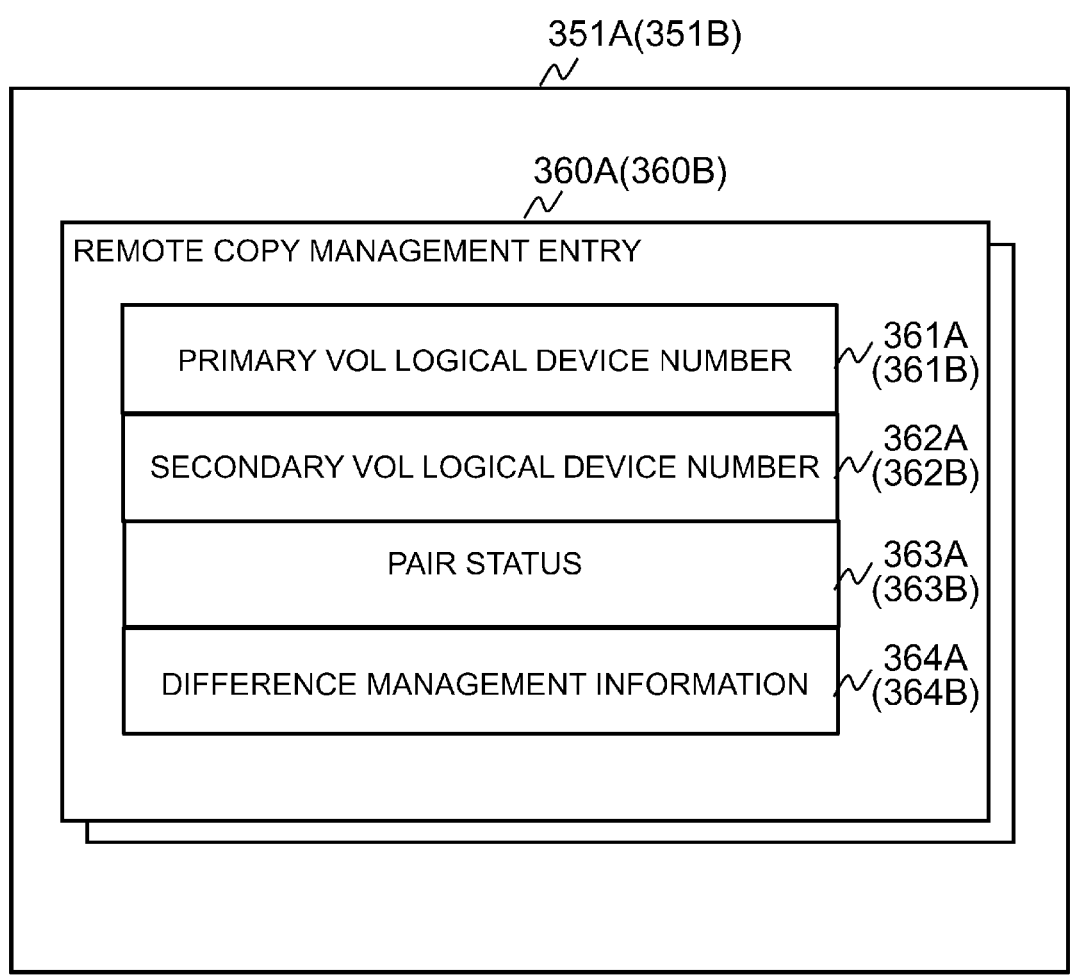
FIG. 29 is a data structure diagram of a remote copy management table according to the third embodiment.

FIG. 29 shows a data structure of the remote copy management table 351A, 351B. The remote copy management table 351A, 351B is information to manage the processing by the remote copy program 350A, 350B and is composed of one or more remote copy management entries 360A, 360B.

A primary-VOL logical device number 361A, 361B, a secondary-VOL logical device identification information 362A, 362B, pair status 363A, 363B, and difference management information 364A, 364B are registered in the remote copy management entry 360A, 360B. The primary-VOL logical device number 361A, 361B is identification information about the copy-source logical device 51A, 51B. Also, the secondary-VOL logical device identification information 362A, 362B is the Fibre Channel address and LUN of a logical unit which provides data of the copy-destination logical device.

The pair status 363A, 363B is information showing the status of processing executed by the remote copy program 350A, 350B between the copy-source logical device 51A, 51B and the copy-destination logical device 51A, 51B and a value of either PAIR or PSUS is set as the pair status 363A, 363B.

If the pair status 363A, 363B is PAIR and the remote copy program 350A, 350B is executing copy processing and a write request to the copy-source logical device 51A, 51B is issued, the remote copy program 350A, 350B copies write data to the copy-destination logical device. This copying is performed synchronously with the write request.

If the pair status 363A, 363B is PSUS, the remote copy program 350A, 350B suspends the copy processing and performs difference management (management of difference information) between data of the copy-source logical device 51A, 51B and data of the copy-destination logical device instead.

For example, when a write request is issued to the copy-source logical device 51A, 51B, the remote copy program 350A, 350B records, in the difference management information 364A, 364B, the occurrence of difference between the copy-source logical device 51A, 51B and the copy-destination logical device with respect to storage areas corresponding to the write request. Then, at timing when the pair status is changed from PSUS to PAIR, the remote copy program 350A, 350B refers to the difference management information 364A, 364B and copies data of the area where the difference occurs, from the copy-source logical device 51A, 51B to the copy-destination logical device 51A, 51B.

The difference management information 364A, 364B is information to manage storage areas, where the difference in data occurs between the copy-source logical device 51A, 51B and the copy-destination logical device 51A, 51B; and is, for example, a bitmap.

In this embodiment, the migration source volume is the logical device 51A in the migration source storage apparatus 4A; and the copy processing (remote copy processing) is executed by the remote copy program 350A between the above-described logical device 51A and a logical device in the storage apparatus 4C. The copy-source logical device 51A for this copy processing will be hereinafter referred to as the primary migration source VOL 370A and the copy-destination logical device will be referred to as the secondary VOL 371.

Furthermore, in this embodiment, the migration destination volume is the logical device 51B in the migration destination storage apparatus 4B. This logical device 51B will be referred to as the primary migration destination VOL 370B.

Figure 30:
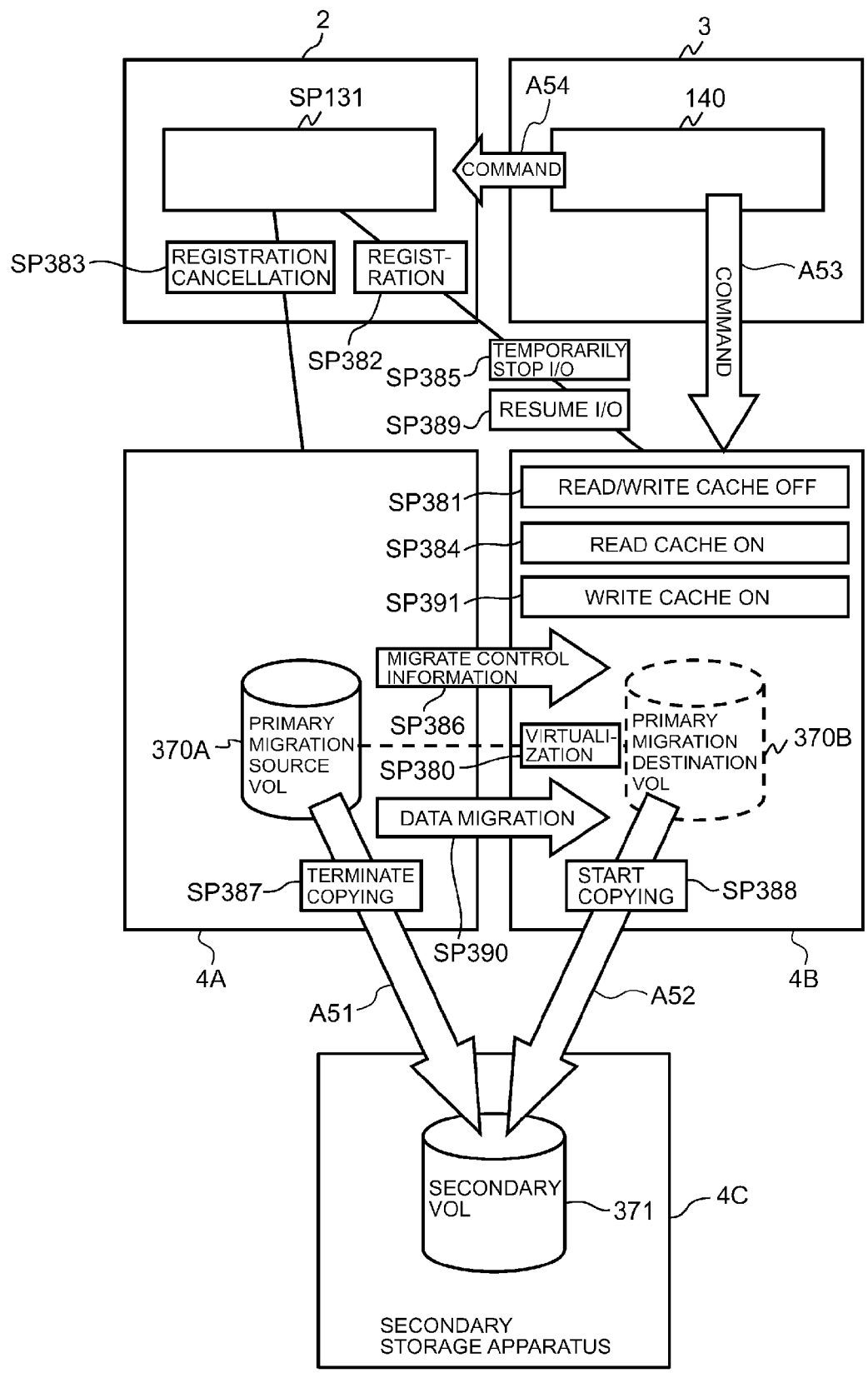
FIG. 30 is a schematic diagram conceptually showing volume migration processing according to the third embodiment.

FIG. 30 conceptually shows the volume migration processing according to this embodiment. As an explanation in relation to the first embodiment, the processing in step SP160 to step SP165 and step SP169 to step SP171 according to the first embodiment is executed on the primary migration source VOL 150A and the primary migration destination VOL 150B as well as the secondary migration source VOL 151A and the secondary migration destination VOL 151B, while in this embodiment the corresponding step SP380 (of starting virtualization) to step SP385 (of temporarily stopping the input/output processing), and step SP389 (of resuming the input/output processing) to step SP391 (write cache on) are executed only on the primary migration source VOL 370A and the primary migration destination VOL 370B.

Also, in the first embodiment, step SP166 and step SP167 are executed on the copy processing (local copy processing) (A13) between the primary migration source VOL 150A and the secondary migration source VOL 151A. On the other hand, in this embodiment, the corresponding step SP386 (processing for migrating the control information) and step SP387 (of terminating the copy processing) are executed on copy processing (remote copy processing) (A51) between the primary migration source VOL 370A and the secondary VOL 370B.

Furthermore, in the first embodiment, step SP168 is executed on the copy processing between the primary migration destination VOL 150B and the secondary migration destination VOL 151B. On the other hand, in this embodiment, the corresponding step SP388 (of starting the copy processing) is executed on copy processing (A52) between the primary migration destination VOL 370B and the secondary VOL 371.

In this way, the latest data can be retained in the primary migration source VOL 370A by keeping the write cache mode off until immediately before step SP391 (write cache on). Therefore, if a failure occurs in the migration destination storage apparatus 4B during the volume migration processing, it is possible to return to the use of the primary migration source VOL 370A where the latest data is retained.

Figure 31:
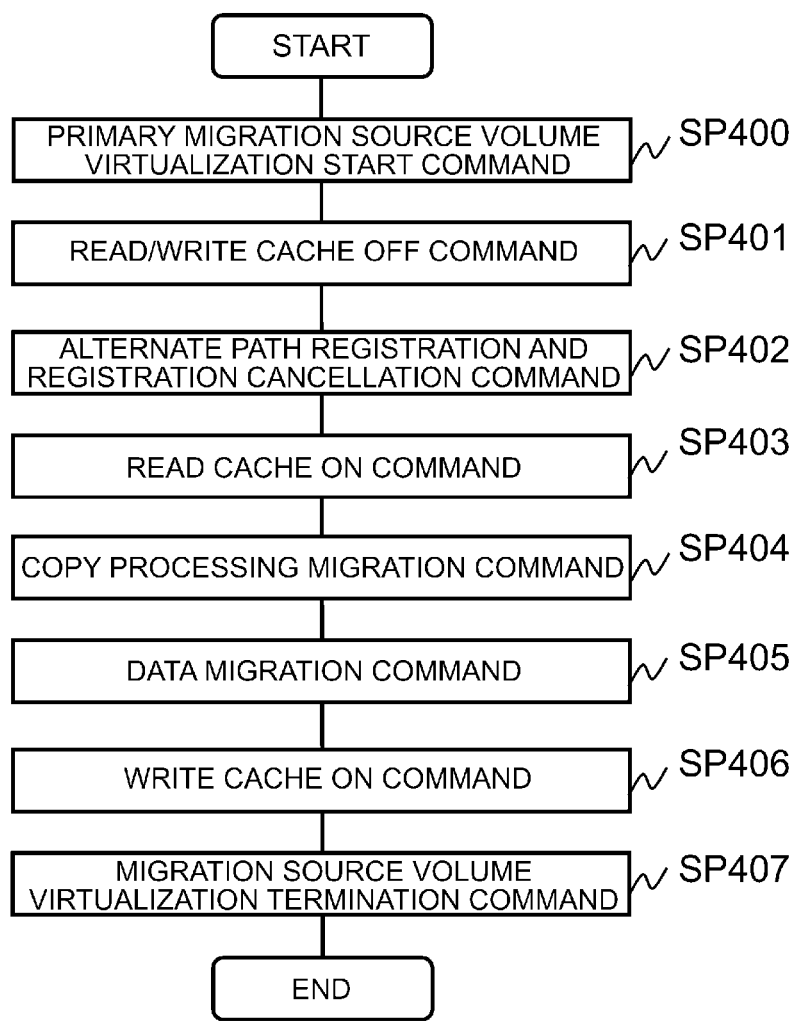
FIG. 31 is a flowchart showing a processing sequence for volume migration command processing according to the third embodiment.

FIG. 31 shows a processing sequence for volume migration command processing executed by the volume migration command program 140 in relation to the volume migration processing according to this embodiment.

After receiving a command from the system administrator via the input device 24 to migrate the primary migration source VOL 370A, the volume migration command program 140 starts the following processing.

Firstly, the volume migration command program 140 gives a command (A53) to the migration destination storage apparatus 4B to start virtualization of the primary migration source VOL 370A (SP400).

Next, the volume migration command program 140 gives a command (A53) to the migration destination storage apparatus 4B to set off the read cache mode and the write cache mode of the primary migration destination VOL 370B (SP401).

Subsequently, the volume migration command program 140 gives a command (A54) to the host computer 2 to register a path to the migration destination storage apparatus 4B as an alternate path to a logical volume corresponding to the primary migration source VOL 370A and cancel the registration of a path to the migration source storage apparatus 4A (SP402).

Then, the volume migration command program 140 gives a command (A53) to the migration destination storage apparatus 4B to set on the read cache mode of the primary migration destination VOL 370B (SP403).

Next, the volume migration command program 140 gives a command (A53) to the migration destination storage apparatus 4B to migrate copy processing (A51) between the primary migration source VOL 370A and the secondary VOL 371 from the migration source storage apparatus 4A to the migration destination storage apparatus 4B (SP404).

Subsequently, the volume migration command program 140 gives a command (A53) to the migration destination storage apparatus 4B to migrate data of the primary migration source VOL 370A to the primary migration destination VOL 370B (SP405).

Then, the volume migration command program 140 gives a command (A53) to the migration destination storage apparatus 4B to set on the write cache mode of the primary migration destination VOL 370B (SP406).

Finally, the volume migration command program 140 gives a command (A53) to the migration destination storage apparatus 4B to terminate virtualization of the primary migration source VOL 370A (SP407).

Since the processing sequence for processing executed by the migration destination storage apparatus 4B or the host computer 2 which received the commands in step SP400 to step SP407 is the same as the processing sequence for the processing executed by the migration destination storage apparatus 4B or the host computer 2 which received the commands in step SP180 to step SP187 in the first embodiment, except that the target volumes are different. So, its explanation has been omitted.

According to this embodiment, a path for migrating volumes between a host computer and storage apparatuses can be formed without depending on the configuration of the host computer and a network device and a plurality of volumes, which are targets of local copying, can be migrated from a migration source storage apparatus to a migration destination storage apparatus, while keeping data of the volumes up-to-date.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, processing units, and so on may be realized by hardware by, for example, designing them in integrated circuits. Also, each of the aforementioned configurations, functions, and so on may be realized by software by the processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

1 Computer system
2 Host computer
3 Management computer
4A Migration source storage apparatus
4B, 4C Migration destination storage apparatuses
5 SAN
6 LAN
11, 21, 41A, 41B Memories
63A, 63B Logical unit management tables
64A, 64B Logical device management tables
65A, 65B Virtual device management tables
66A, 66B Cache management tables
67A, 67B Local copy management tables
131 Alternate path program
140 Volume migration command program
150A Primary migration source VOL
150B Secondary migration source VOL
151A Primary migration destination VOL
151B Secondary migration destination VOL
340 Computer system

The invention claimed is:

1. A storage system comprising:
a first storage system comprising at least one first processor, the first storage system, executed by the at least one first processor, configured to provide a migration source volume to a computer;
a second storage system comprising at least one second processor, the second storage system, executed by the at least one second processor, configured to include a first virtual storage device and a second virtual storage device; and
a third storage system comprising at least one third processor, the third storage system, executed by the at least one third processor, configured to execute a first remote copy processing with the migration source volume in the first storage system, the first storage system receiving a first input/output (I/O) request from the computer via a first path between the computer and the first storage system,
wherein the second storage system, executed by the at least one second processor, is configured to:
provide a migration destination volume associated with the first virtual storage device which virtualizes the migration source volume,
set up a second path between the computer and the second storage system,
start a second remote copy processing between the migration destination volume in the second storage system and a volume provided by the third storage system, execute data migration to copy data stored in each unit storage area of the first virtual storage device, which virtualizes the migration source volume of the first storage system, to the second virtual storage device after starting the second remote copy processing, and manage data migration status of each unit storage area of the first virtual storage device which virtualizes the migration source volume of the first storage system, wherein during the data migration, the second storage system, executed by the at least one second processor, is configured to:

in response to receiving a second I/O request from the computer to the migration destination volume via the second path, store write data of the second I/O request in the migration source volume of the first storage system via the first virtual storage device which virtualizes the migration source volume, store the write data of the second I/O request in the second virtual storage device which is copied data stored in the first virtual storage device of the second storage system, send a write response to the host computer after storing the write data in the first virtual storage device and the second virtual storage device, and execute the second remote copy processing of the write data between the migration destination volume in the second storage system and the volume provided by the third storage system, wherein the second storage system, executed by the at least one second processor, is configured to determine whether or not data stored in all unit storage areas of the first virtual storage device are copied to the second virtual storage device, wherein when data stored in all unit storage areas of the first virtual storage device are copied to the second virtual storage device, the second storage system, executed by the at least one second processor, is configured to terminate the data migration and instruct the first storage system to terminate the first remote copy processing between the migration source volume in the first storage system and the third storage system, and the first storage system is configured to terminate the first remote copy processing, and wherein after the data migration, the second storage system, executed by the at least one second processor, is configured to:

release a first association between the migration destination volume and the first virtual storage device which virtualizes the migration source volume, create a second association between the migration destination volume and the second virtual storage device which copied data stored in the first virtual storage device, in response to receiving a third I/O request from the computer to the migration destination volume via the second path, not to store write data of the third I/O request in the migration source volume of the first storage system, and store the write data of the third I/O request in the second virtual storage device of the second storage system.

2. The storage system according to claim 1, wherein the second storage system includes a cache memory for temporarily storing data; and when the second storage system receives the second I/O request to the migration destination volume via the second path, the second storage system is configured to send data stored in the cache memory as data requested by the second I/O request to the computer.

3. The storage system according to claim 1, wherein:

after temporarily stopping the second I/O request processing on the migration destination volume, the second storage system is configured to start a control information migration processing and then resume the second I/O request processing on the migration destination volume; and on condition that a copy processing by the first storage system has terminated, the second storage system is configured to execute the second remote copy processing between the migration destination volume in the second storage system and the volume provided by the third storage system, based on control information for the copy processing which has been migrated by the control information migration processing.

4. The storage system according to claim 1, wherein the second storage system has a plurality of copy-source virtual devices which belong to the migration destination volume, are virtual devices connected to the migration source volume, and are copy sources, and the third storage system has a plurality of copy-destination virtual devices which are copy destinations for data stored in the plurality of copy-source virtual devices; and wherein when the second storage system receives a write request to the migration destination volume while executing the data migration for migrating the migration source volume, the second storage system is configured to execute an update copy processing for writing write data to the plurality of copy-source virtual devices, write the write data to the migration source volume, and copy the write data, which has been written to the plurality of copy-source virtual devices, to the plurality of copy-destination virtual devices.

5. The storage system according to claim 1, wherein:

after an execution of a control information migration processing by the second storage system, the first storage system is configured to terminate a copy processing between the migration source volume and the volume provided by the third storage system; and when the first storage system receives a write request to the migration source volume, the first storage system is configured to manage data difference information between the migration source volume and the volume provided by the third storage system.

6. The storage system according to claim 1, wherein the first storage system is configured to select two or more pairs, each of which is constituted from the migration source volume and the volume provided by the third storage system, control a copy processing on the two or more selected pairs, and store control information for the copy processing on the two or more selected pairs; and wherein the second storage system is configured to execute, as the data migration for migrating the migration source volume, a control information migration processing for migrating the control information for the copy processing, which is stored by the first storage system, to the second storage system with respect to each of the pairs and the data migration for migrating data stored in the migration source volume to the migration destination volume with respect to each of the pairs.

7. The storage system according to claim 1, wherein the second storage system includes a cache memory for temporarily storing data;

wherein the second storage system has an operation mode to set on or off each of a read cache mode and a write cache mode as an operation mode to manage the migration destination volume;

wherein the second storage system is configured to virtualize the migration source volume as the migration destination volume and provide them to the computer, and then set off the read cache mode and set off the write cache mode; and when receiving a read request from the computer, the second storage system is configured to execute, as processing in a case where the read cache mode is off, an read-cache-off processing for reading read data from the virtualized migration source volume and sending the read data, which has been read, to the computer; and when receiving write data from the computer, the second storage system is configured to execute, as processing in a case where the write cache mode is off, a write-through processing for storing the received write data in the virtualized migration source volume and then sending a write response to the computer; and wherein when the second storage system receives the second I/O request for the migration destination volume via the second path, the second storage system is configured to continue executing the write-through processing and set on the read cache mode until termination of the data migration for migrating the migration source volume; and as processing in a case where the read cache mode is on, the second storage system is configured to temporarily store the read data in the cache memory and then execute read-cache-on processing for sending the read data, which is stored in the cache memory, to the computer when receiving a read request for the read data stored in the cache memory.

8. A migration method executed in a storage system, the storage system comprising a first storage system providing a migration source volume to a computer, a second storage system including a first virtual storage device and a second virtual storage device, and a third storage system executing a first remote copy processing with the migration source volume in the first storage system, the first storage system receiving a first input/output (I/O) request from the computer via a first path between the computer and the first storage system, the migration method comprising the steps of:

providing, by the second storage system, a migration destination volume associated with the first virtual storage device which virtualizes the migration source volume;

setting up, by the second storage system, a second path between the computer and the second storage system;

starting, by the second storage system, a second remote copy processing between the migration destination volume in the second storage system and a volume provided by the third storage system;

executing, by the second storage system, data migration to copy data stored in each unit storage area of the first virtual storage device, which virtualizes the migration source volume of the first storage system, to the second virtual storage device after starting the second remote copy processing; and managing, by the second storage system, data migration status of each unit storage area of the first virtual storage device which virtualizes the migration source volume of the first storage system, and wherein during the data migration, the second storage system, in response to receiving a second I/O request from the computer to the migration destination volume via the second path, stores write data of the second I/O request in the migration source volume of the first storage system via the first virtual storage device which virtualizes the migration source volume, stores the write data of the second I/O request in the second virtual storage device which is copied data stored in the first virtual storage device of the second storage system, sends a write response to the host computer after storing the write data in the first virtual storage device and the second virtual storage device, and executes the second remote copy processing of the write data between the migration destination volume in the second storage system and the volume provided by the third storage system, wherein the second storage system determines whether or not data stored in all unit storage areas of the first virtual storage device are copied to the second virtual storage device, wherein when data stored in all unit storage areas of the first virtual storage device are copied to the second virtual storage device, the second storage system terminates the data migration and instructs the first storage system to terminate the first remote copy processing between the migration source volume in the first storage system and the third storage system, and the first storage system terminates the first remote copy processing, wherein after the data migration, the second storage system releases a first association between the migration destination volume and the first virtual storage device which virtualizes the migration source volume, and creates a second association between the migration destination volume and the second virtual storage device which copied data stored in the first virtual storage device, and wherein in response to receiving a third I/O request from the computer to the migration destination volume via the second path, the second storage system does not store write data of the third I/O request in the migration source volume of the first storage system, and stores the write data of the third I/O request in the second virtual storage device of the second storage system.

9. The migration method according to claim 8, wherein the second storage system includes a cache memory for temporarily storing data, further comprising:

a step executed by the second storage system, when receiving the second I/O request to the migration destination volume via the second path, of sending data stored in the cache memory as data requested by the second I/O request to the computer.

10. The migration method according to claim 8, further comprising a step executed by the second storage system of, after temporarily stopping the second I/O request processing on the migration destination volume, starting a control information migration processing and then resuming the second I/O request processing on the migration destination volume; and on condition that a copy processing by the first storage system has terminated, executing the second remote copy processing between the migration destination volume in the second storage system and the volume provided by the third storage system, based on control information for the copy processing which has been migrated by the control information migration processing.

11. The migration method according to claim 8, wherein the second storage system has a plurality of copy-source virtual devices which belong to the migration destination volume, are virtual devices connected to the migration source volume, and are copy sources, and the third storage system has a plurality of copy-destination virtual devices which are copy destinations for data stored in the plurality of copy-source virtual devices, further comprising:

a step executed by the second storage system, when receiving a write request to the migration destination volume while executing the data migration for migrating the migration source volume, of executing an update copy processing for writing write data to the plurality of copy-source virtual devices, writing the write data to the migration source volume, and copying the write data, which has been written to the plurality of copy-source virtual devices, to the plurality of copy-destination virtual devices.

12. The migration method according to claim 8, further comprising a step executed by the first storage system after the execution of a control information migration processing by the second storage system, of terminating a copy processing between the migration source volume and the volume provided by the third storage system; and managing data difference information between the migration source volume and the volume provided by the third storage system when receiving a write request to the migration source volume.

13. The migration method according to claim 8, further comprising:

a step executed by the first storage system of selecting two or more pairs, each of which is constituted from the migration source volume and the volume provided by the third storage system, controlling a copy processing on the two or more selected pairs, and storing control information for the copy processing on the two or more selected pairs; and a step executed by the second storage system of executing, as the data migration for migrating the migration source volume, a control information migration processing for migrating the control information for the copy processing, which is stored by the first storage system, to the second storage system with respect to each of the pairs and the data migration for migrating data stored in the migration source volume to the migration destination volume with respect to each of the pairs.

14. The migration method according to claim 8, wherein the second storage system includes a cache memory for temporarily storing data, and the second storage system has an operation mode to set on or off each of a read cache mode and a write cache mode as an operation mode to manage the migration destination volume, the method further comprising:

a step executed by the second storage system of virtualizing the migration source volume as the migration destination volume and providing them to the computer, and then setting off the read cache mode and setting off the write cache mode;

a step executed by the second storage system, when receiving a read request from the computer, of executing, as processing in a case where the read cache mode is off, an read-cache-off processing for reading read data from the virtualized migration source volume and sending the read data, which has been read, to the computer;

a step executed by the second storage system, when receiving write data from the computer, of executing, as processing in a case where the write cache mode is off, a write-through processing for storing the received write data in the virtualized migration source volume and then sending a write response to the computer;

a step executed by the second storage system, when receiving the second I/O request for the migration destination volume via the second path, of continuing executing the write-through processing and setting on the read cache mode until termination of the data migration for migrating the migration source volume; and a step executed by the second storage system, as processing in a case where the read cache mode is on, of temporarily storing the read data in the cache memory and then executing read-cache-on processing for sending the read data, which is stored in the cache memory, to the computer when receiving a read request for the read data stored in the cache memory.

* * * * *